US008650808B2

(12) United States Patent
Hooper

(10) Patent No.: US 8,650,808 B2
(45) Date of Patent: Feb. 18, 2014

(54) CURVED SURFACE BUILDING MODULES

(76) Inventor: Percy Hooper, Cary, NC (US)

( * ) Notice: Subject to any disclaimer, the term of this patent is extended or adjusted under 35 U.S.C. 154(b) by 0 days.

(21) Appl. No.: 13/011,882

(22) Filed: Jan. 22, 2011

(65) Prior Publication Data

US 2011/0179724 A1 Jul. 28, 2011

Related U.S. Application Data

(60) Provisional application No. 61/297,362, filed on Jan. 22, 2010.

(51) Int. Cl.
*E04B 7/10* (2006.01)
*A63H 33/08* (2006.01)

(52) U.S. Cl.
USPC ............. 52/80.2; 446/108; 446/115; 446/124

(58) Field of Classification Search
USPC ................ 52/18, 80.1, 80.2, 81.1, 81.4, 81.5;
446/85, 108, 115, 120, 124, 125
See application file for complete search history.

(56) References Cited

U.S. PATENT DOCUMENTS

| | | | | | |
|---|---|---|---|---|---|
| 2,891,491 | A | * | 6/1959 | Richter | 52/80.1 |
| 3,533,202 | A | * | 10/1970 | Gellert | 52/80.1 |
| 3,557,501 | A | | 1/1971 | Kolozsvary | |
| 3,663,347 | A | * | 5/1972 | Schoen | 428/116 |
| 3,738,083 | A | | 6/1973 | Shimano | |
| 3,931,697 | A | * | 1/1976 | Pearce | 52/81.1 |
| 4,306,391 | A | * | 12/1981 | Crosby | 52/79.4 |
| 4,425,740 | A | | 1/1984 | Golden | |
| 5,020,287 | A | * | 6/1991 | Woods | 52/80.2 |
| 5,036,635 | A | * | 8/1991 | Lalvani | 52/80.1 |
| 5,291,702 | A | * | 3/1994 | Hooper | 52/80.1 |
| 5,524,396 | A | * | 6/1996 | Lalvani | 52/81.1 |
| 5,581,960 | A | * | 12/1996 | Lewis | 52/80.1 |
| 6,935,076 | B2 | * | 8/2005 | Amir | 52/80.2 |
| D544,104 | S | * | 6/2007 | Grotbeck | D25/56 |
| 8,100,072 | B2 | * | 1/2012 | Wilkinson et al. | 114/102.1 |

* cited by examiner

*Primary Examiner* — Ryan Kwiecinski
(74) *Attorney, Agent, or Firm* — Coats and Bennett, P.L.L.C.

(57) ABSTRACT

A three-dimensional, curved building module comprises a saddle-shaped membrane having four connecting edges for joining with like building modules and four truncating edges. Connecting members are formed along the linear edge surfaces for joining the modules in edge-to-edge relation with one another. The building modules permit construction of complex, three dimensional forms which divide space into two distinct but intertwining volumes. The building modules may be used as a child's construction toy, playground structures, sculptures, architectural structures.

11 Claims, 37 Drawing Sheets

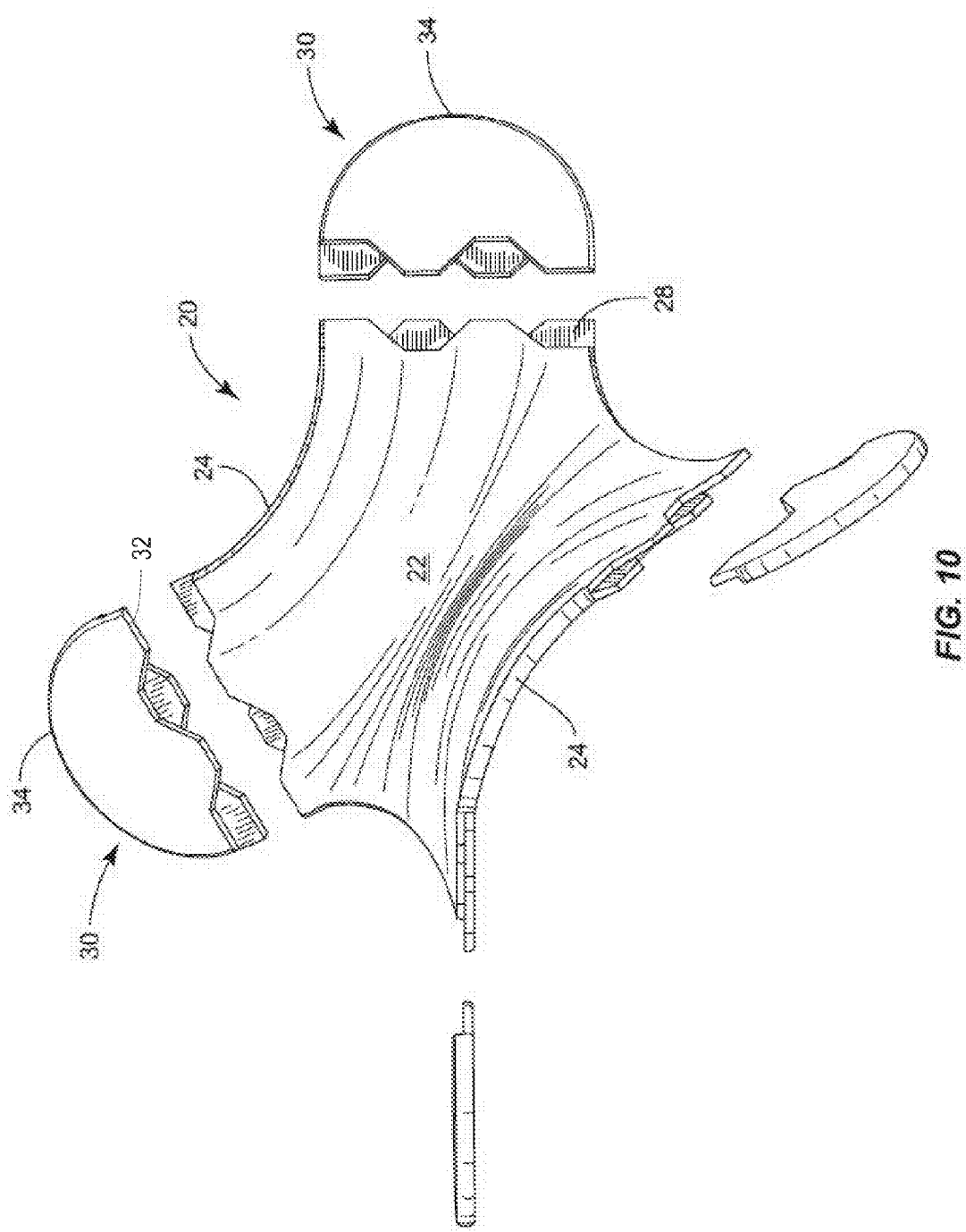

CURVED SURFACE BUILDING MODULES

BACKGROUND

The present invention relates generally to building modules and more particularly building modules having curved, saddle shaped surfaces which can be connected edge-to-edge to form labyrinth-like space-filling structures.

The earliest building blocks, aside from stones or bricks stacked upon one another, were probably simple wooden blocks made for stacking. In the 1950's, toy building systems were introduced which included columns and beams that could be snapped together to create an X-Y-Z coordinate framework. Flat modules could also be snapped onto the framework to create three-dimensional space-defining structures. This type of building system however, is limited since all of the components are essentially two-dimensional. The columns and beams correspond to line segments while the flat modules correspond to finite planar elements. In such a building system, the child perceives his three-dimensional construction as a composite of two-dimensional components. A further drawback of this type of building system is that it comprises many loose components which when left in the hands of children are easily lost.

U.S. Pat. No. 4,055,019, discloses a construction toy consisting of a plurality of multi-sided planar elements that snap together edge-to-edge to form various polyhedra. The construction toy is intended to teach children about relatively complex solid geometrics. However, like the X-Y-Z frameworks, the three-dimensional construction is still perceived as a composite of two-dimensional components. Moreover, the construction toy does not invite children to explore and learn about the intricately shaped voids that are inherently created in between the solid, physical components that bound them.

In U.S. Pat. No. 3,931,697, modular construction system based on a series of minimal surfaces bounded by skewed polygons. Six basic modules are described which are capable of being interconnected in various combinations to crate space-defining or space-filling structures.

U.S. Pat. No. 5,291,702 discloses a modular construction system for children which consists of a plurality of identical four-sided modules which can be "snapped together" to build a three-dimensional, space-defining structure. Each module consists of a saddle-shaped membrane of constant thickness bounded by four identical, contiguous edge surfaces. Each bounding edge lies essentially flush with the face of a circumscribing polyhedron while simultaneously lying along the edge of a circumscribing polyhedron.

SUMMARY AND OBJECTS OF THE INVENTION

The present invention is a modular construction system comprising of a plurality of building modules which can be "snapped together" to build a three-dimensional, space-defining structure. Each module consists of a saddle-shaped membrane of constant thickness. The configuration of the module edge allows it to join to other modules to form space-defining or space-filling structures. When connected, the building modules form a continuous curving membrane which folds back upon itself creating a labyrinth-like structure with intertwining tunnels. The undulating membrane of building modules divides space into two separate volumes of space on opposing sides of the membrane. The building modules may also be used to as a child's construction toy to enable a child to construct and explore complex forms not attainable in conventional building blocks or flat module/I-beam construction systems. The system allows the child to build a three-dimensional labyrinth for his imagination to explore and populate. The building modules may also be used to build construct playground structures, sculptures, and architectural structures.

BRIEF DESCRIPTION OF THE DRAWINGS

FIG. 10 is an exploded of a building module according to a second embodiment.

DETAILED DESCRIPTION

Figure 1:
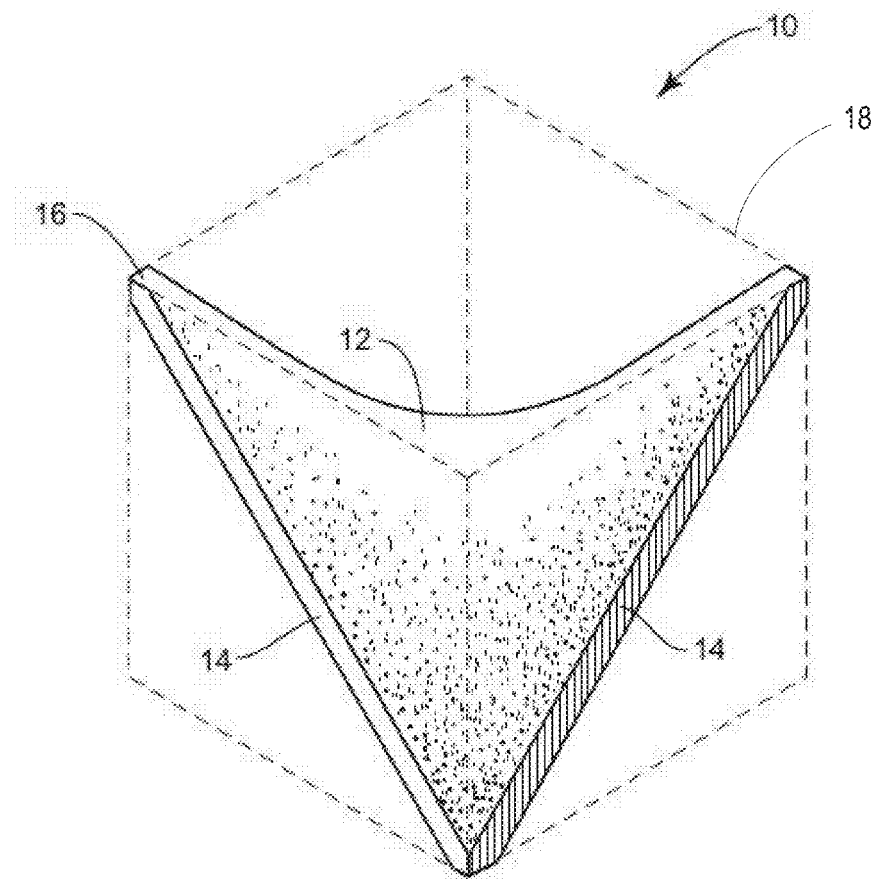
FIG. 1 is an isometric view of an exemplary building module.

Referring now to the drawings, FIG. 1 illustrates a building module 10 in the form of a hyperbolic paraboloid. The building module 10 comprises a saddle-shaped membrane 12 of substantially constant thickness having four edge surfaces 14 which form a skewed polygon. The saddle-shaped membrane 12 includes top and bottom surfaces, which are curved in three dimensions. The edge surfaces 14 of the building module 12 each lie in the plane of a circumscribing polyhedron, which in this example is a cube, though other polyhedron can be used. The corners where the adjacent edge surfaces 14 meet are truncated so as to leave small triangular surfaces 16, which also lie in a respective plane of the circumscribing cube 18. The truncation of the corners allows the modules 10 to be joined as hereinafter described. It will be appreciated that the circumscribing cube is not a physical structure, but instead is an abstraction that is useful in defining or explaining the geometry of the building module 20.

Figure 2A:
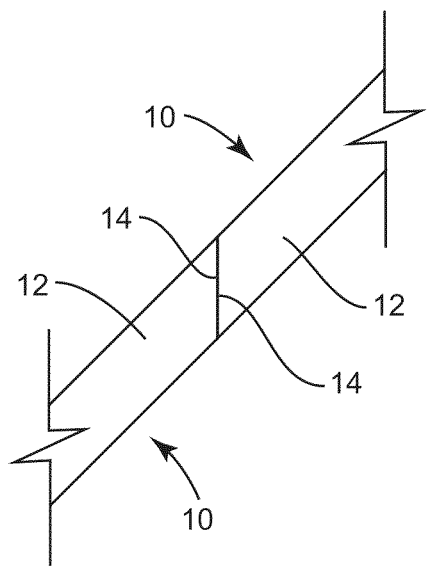
FIGS. 2A and 2B illustrate the possible joint configurations for two adjacent building modules.
Figure 2B:
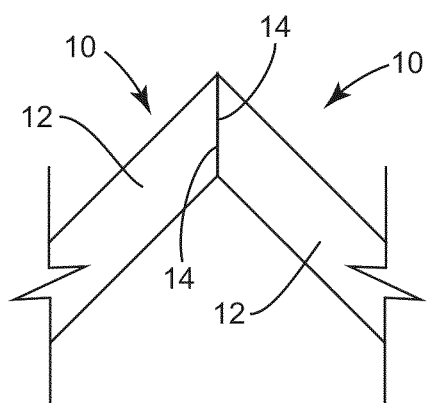
Figure 3A:
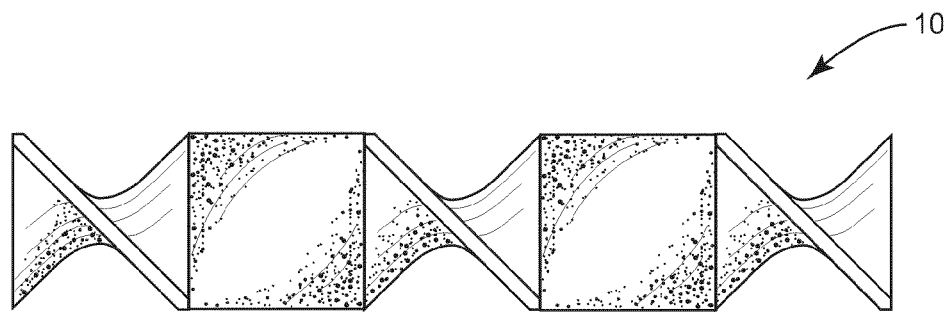
FIG. 3A illustrates a linear array of five building modules formed using right-handed helix joints.
Figure 3B:
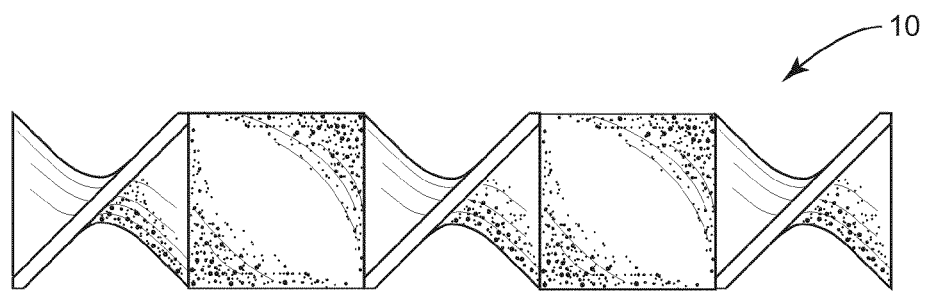
FIG. 3B illustrates a linear array of five building modules formed using left-handed helix joints.
Figure 3C:
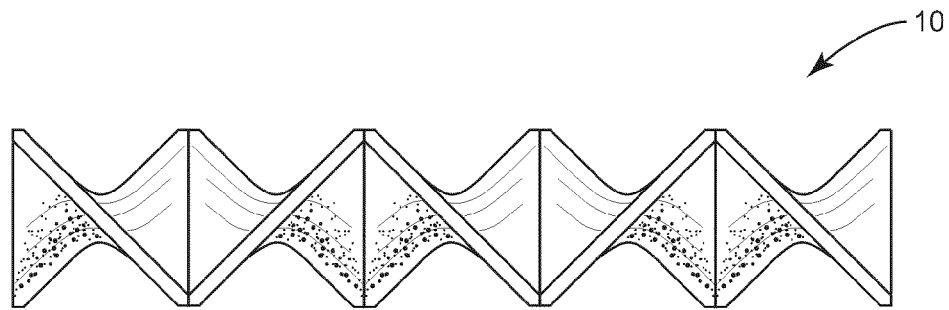
FIG. 3C illustrates a linear array of five building modules formed using mirror image joints.
Figure 4:
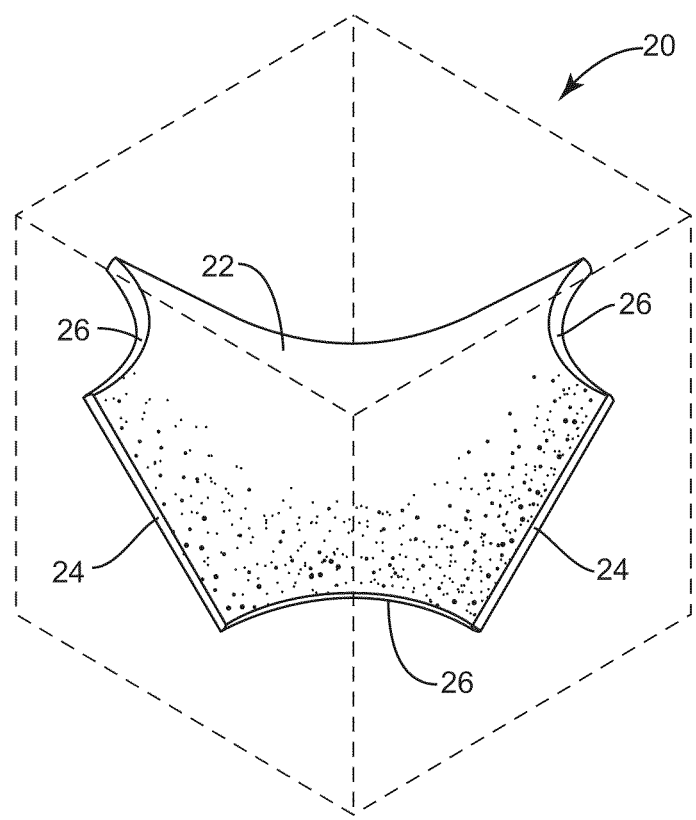
FIG. 4 is an isometric view of an exemplary building module according to a first embodiment.
Figure 5:
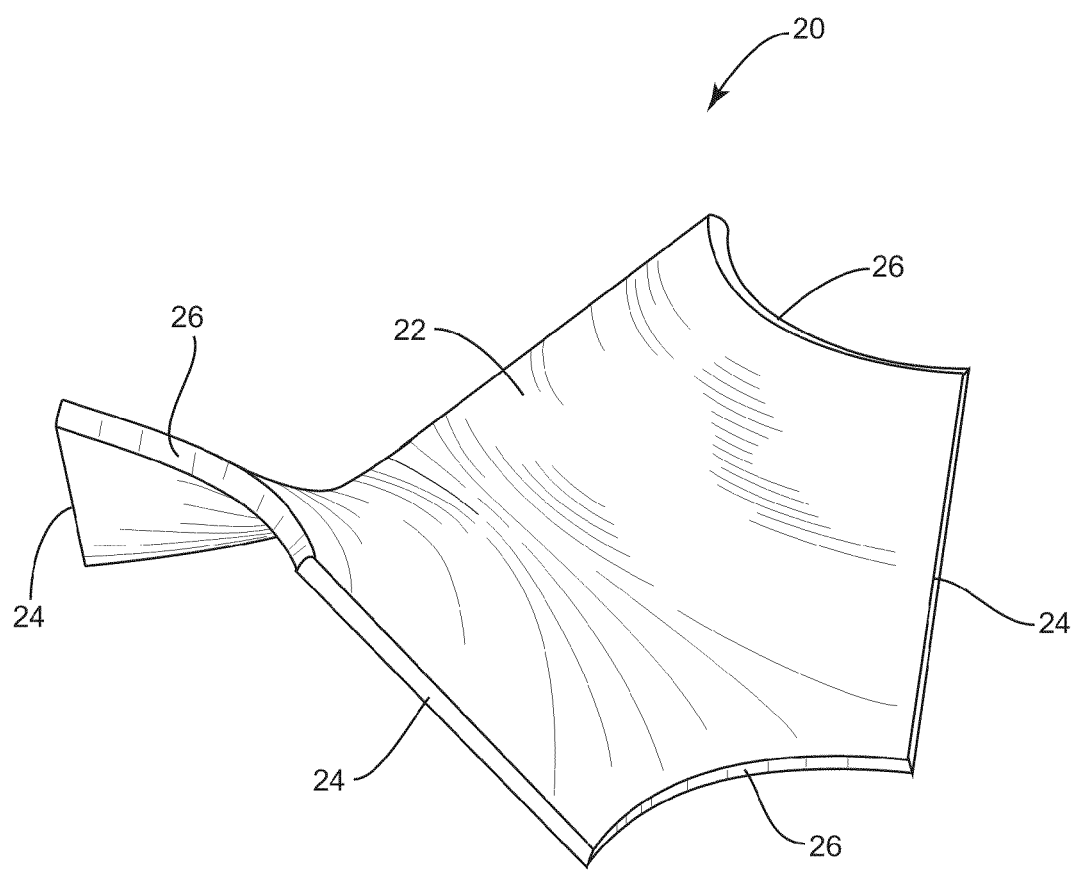
FIG. 5 is a perspective view of the building module according to the first embodiment.
Figure 6:
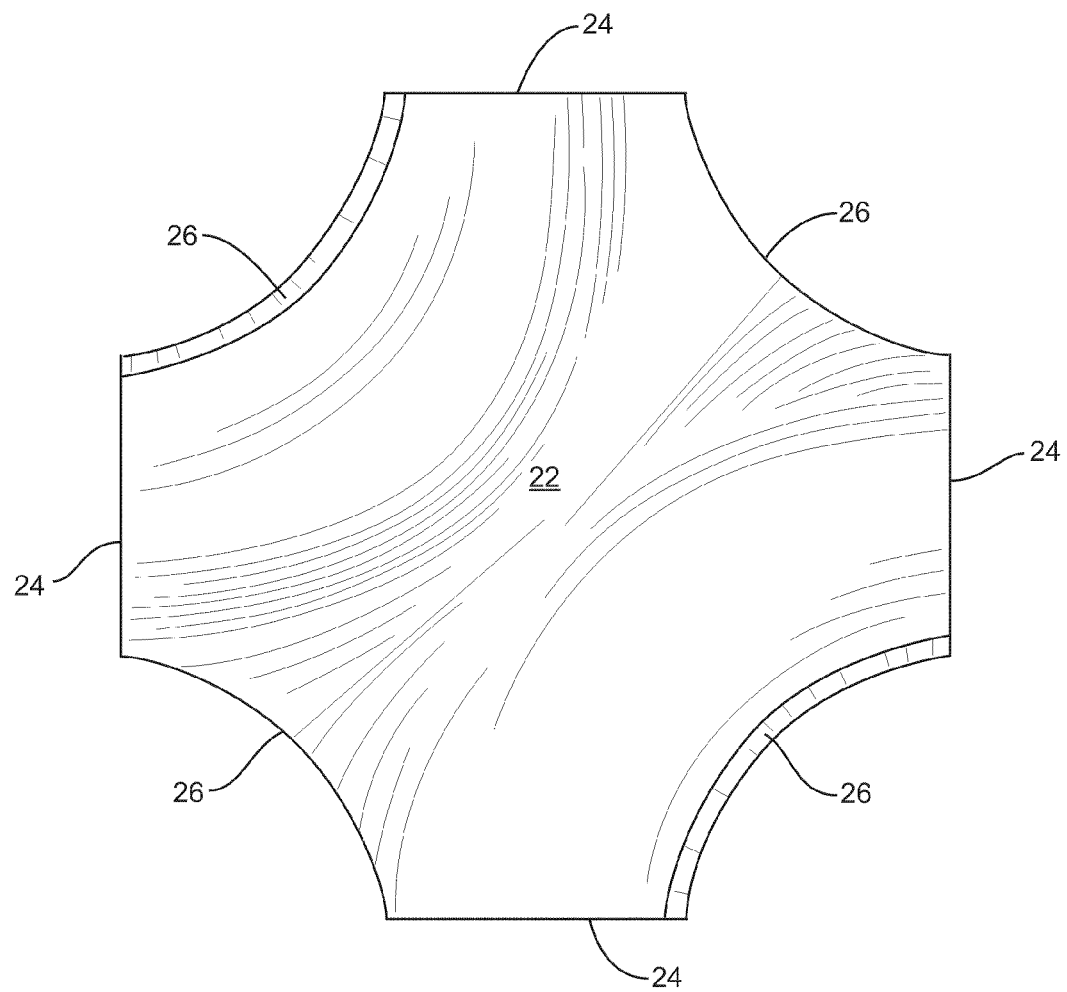
FIG. 6 is a top view of the building module according to the first embodiment.
Figure 7:
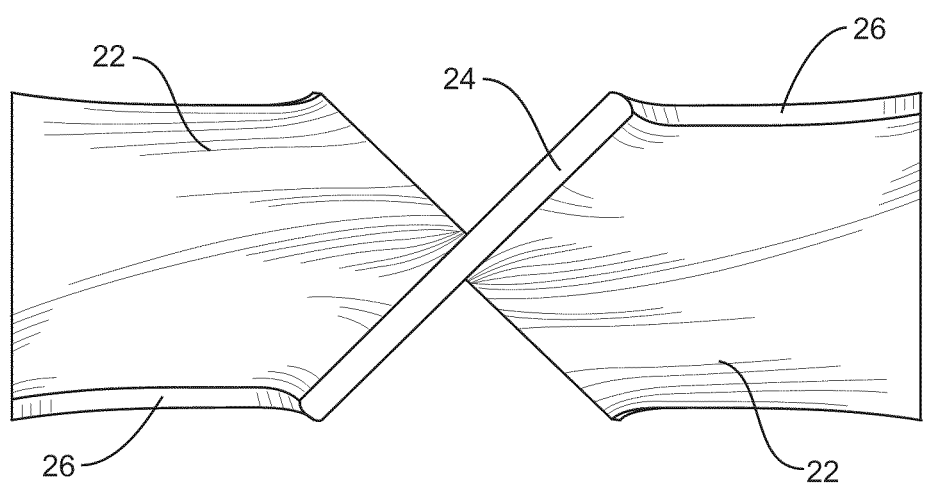
FIG. 7 is a front elevation view of the building module according to the first embodiment.
Figure 8:
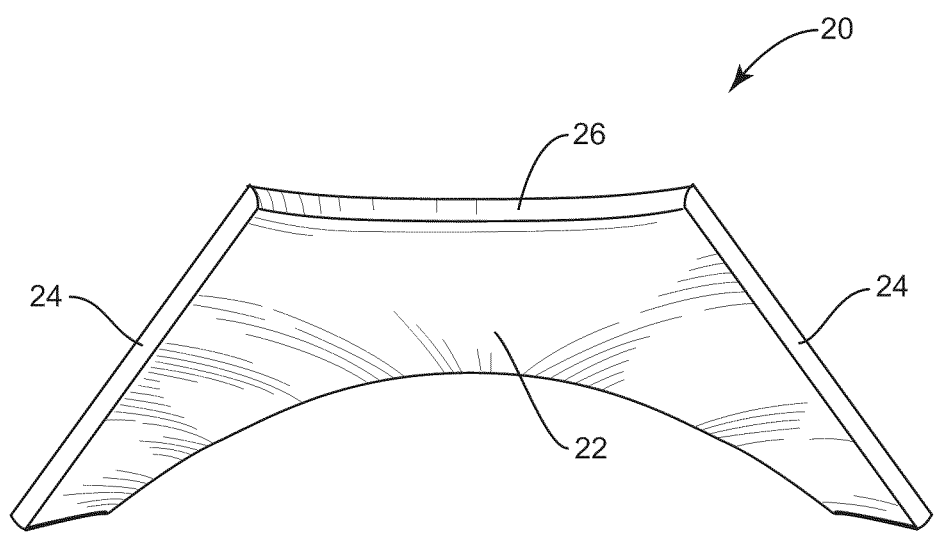
FIG. 8 is an elevation view of the building module according to the first embodiment from a 45 degree angle.

The building modules 10 may be joined edge-to-edge in three different joint configurations. The joint configurations are referred to herein as the right-handed helix joint, left-handed helix joint, and mirror image joint. The right and left-handed helix joints allow the curved surfaces of the membrane 12 to flow smoothly across the joint without apparent interruption as shown in FIG. 2A so that a second module 10 continues the curve where the first module 10 leaves off. If a series of modules 10 are connected linearly in this manner, the curved surfaces of the membranes 12 form a helix. FIGS. 3A and 3B illustrate a linear array of five building modules 10 connected using right-handed and left-handed helix joints respectively. In the mirror image joint, shown in FIG. 2B, the curved surfaces of the membranes 12 appear to be mirror images of one another. The plane where the two building modules 10 join is the apparent mirror plane. In this configuration, the curved surfaces of the membranes 12 make an abrupt change of direction at the mirror plane as shown in FIG. 2B. FIG. 3C shows a linear array of five building modules 10 connected using mirror image joints.

Using identical building modules 10, an infinite variety of spacing-enclosing structures can be formed. The spacing-enclosing structures may be relatively simple undulating planes, finite polyhedron, or finite 3-dimensional structures capable of infinite expansion. The membranes 12 of the connected building modules 10 form a continuous membrane that divides the occupied space into two distinct but complementary spatial regions separated. These spatial regions may intertwine but never touch. U.S. Pat. No. 5,291,702, which is incorporated herein in its entirety by reference, discloses some of the space-defining structures that can be constructed using identical building modules 10.

FIGS. 4-8 illustrate another exemplary building module 20 according to one embodiment of the present invention. The building module 20 comprises a saddle-shaped membrane 22 with top and bottom surfaces that are curved in three dimensions. The building module 20 has four connecting edges 24 that lie proximate respective planes of a circumscribing cube, shown in dotted lines in FIG. 4, and four inwardly-curved, truncating edges 26. The connecting edges 24 are configured to join or mate with the connecting edges 24 of like building modules 20. The truncating edges 26 are inwardly spaced from the surfaces of the circumscribing cube and cut off or truncate the membrane 22. The ends of each connecting edge 24 connect with the ends of two adjacent truncating edges 26. Similarly, the ends of each truncating edge 26 connects with ends of adjacent connecting edges 24. The connecting edges 24 are disposed proximate respective faces of a circumscribing cube while the truncating edges 26 curve inwardly as seen in the top view. The final edge configuration is a skewed polygon with corners truncated by generally circular arcs.

Figure 9A:
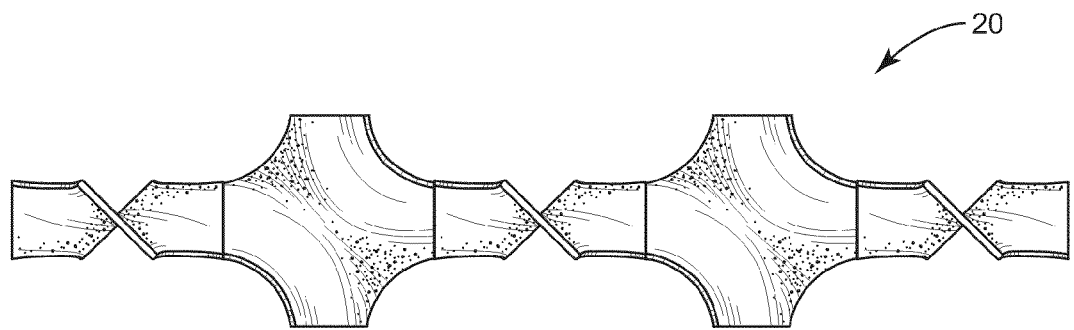
FIG. 9A illustrates a linear array of five building modules according to the first embodiment formed using right-handed helix joints.
Figure 9B:
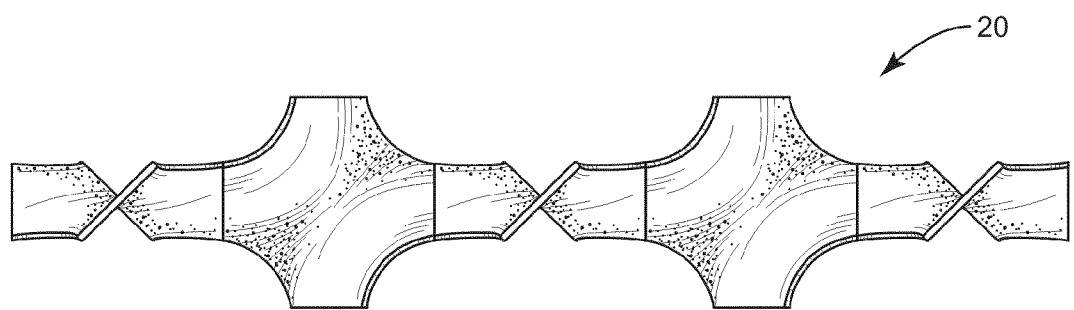
FIG. 9B illustrates a linear array of five building modules according to the first embodiment formed using left-handed helix joints.
Figure 9C:
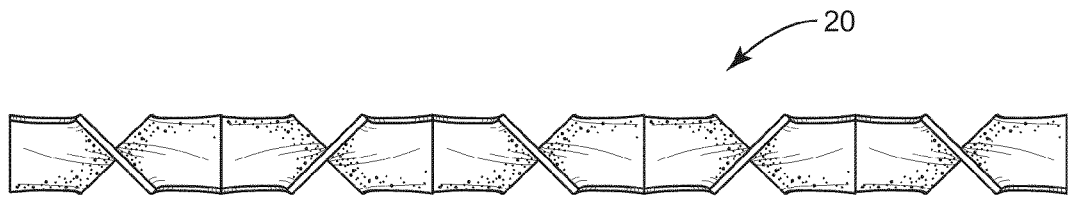
FIG. 9C illustrates a linear array of five building modules according to the first embodiment formed using mirror image joints.

Because the connecting edges 24 are disposed on the faces of a circumscribing cube, the building modules 20 can be connected edge-to-edge in the same manner as the building modules 10 shown in FIG. 1. The same three joint configurations described above also apply to building module 20. That is, the building modules 20 can be joined edge-to-edge to form right-handed or left-handed helix joints, or mirror image joints. FIGS. 9A and 9B show a linear array of five building modules 20 connected using right-handed and left-handed helix joints respectively. FIG. 9C illustrates a linear array of five building modules 20 connected using mirror image joints.

As with building modules 10, the building modules 20 can be connected together to form an infinite variety of spacing-defining or space-filing structures. The membranes 22 of the connected building modules 20 will form a continuous membrane that divides the occupied space into two regions. In contrast to the structures formed with building module 10, the continuous membrane of the structure constructed with building modules 20 includes openings that connect the spaces on opposing sides of the continuous membrane.

Figure 39:
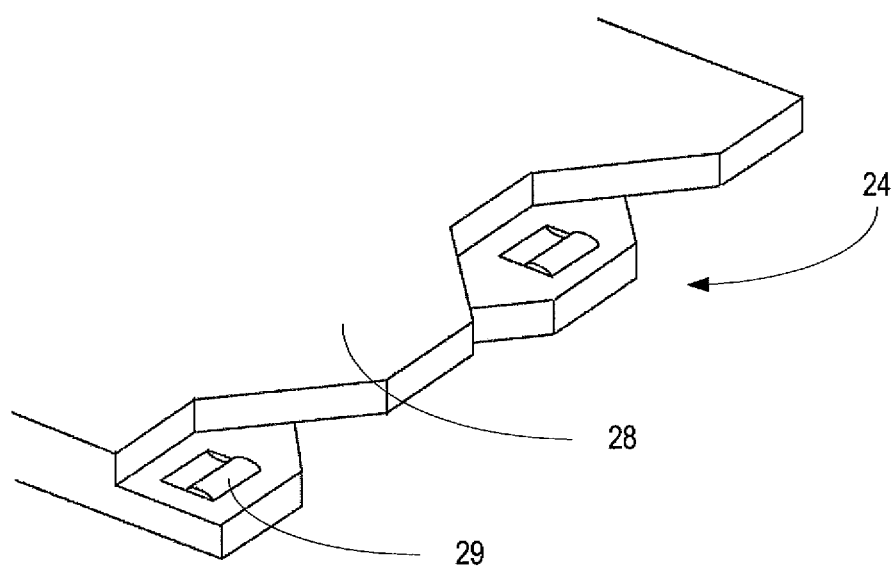
FIG. 39 is a detail view illustrating connecting teeth on a building module.

To facilitate joining of the building modules 20 in edge-to-edge relation, the connecting edges 24 of the building module 20 may be formed with sets of overlapping teeth 28 or other forms of interlocking features as shown in FIG. 10. In the exemplary embodiment, each connecting edge 24 includes two rows of teeth 28. One row of teeth 28 is disposed adjacent the top surface of the membrane 22 and the second row of teeth 28 is disposed adjacent the bottom surface of the membrane 22. When the building modules 20 are joined edge-to-edge, the teeth 28 in one building module 20 frictionally engage with the teeth 28 of the adjacent building module 20 to hold the building modules 20 together. Slight pushing or pulling pressure can be used to connect or disconnect the building modules 20. The arrangement of the teeth 28 as shown allows the connection of the building modules 20 in each of the three joint configurations previously described. The teeth 28 can be formed with undercuts or detents 29 to help prevent separation of the building modules 20 as shown in FIG. 39.

Figure 11:
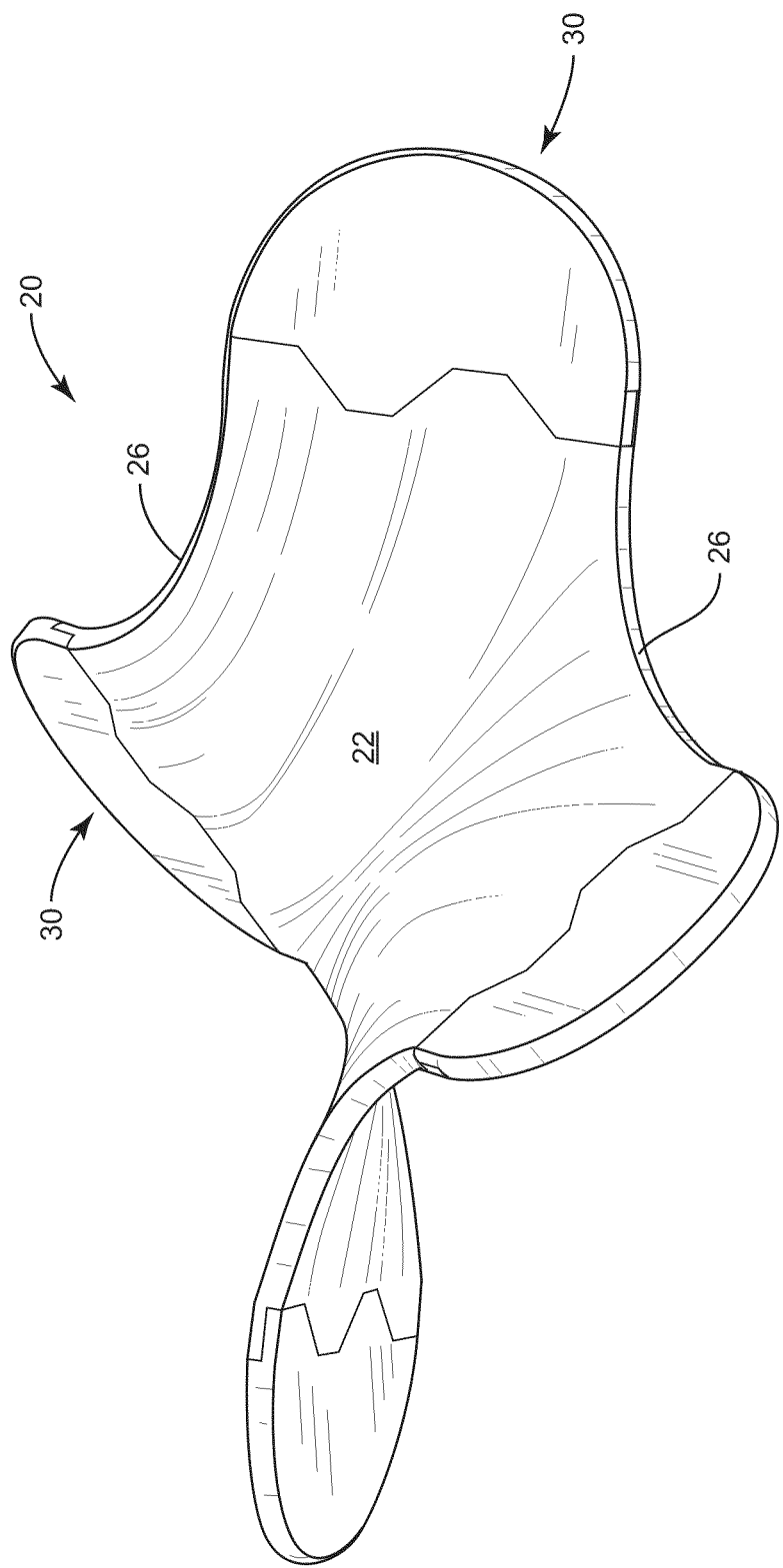
FIG. 11 is an assembled perspective view of the building module according to the second embodiment.

In some embodiments of the invention, terminating caps 30 may be provided to connect to the connecting edges 26 of the building modules 20 to provide a more finished look and a smoother, more flowing form as shown in FIG. 10. In the exemplary embodiment, the terminating caps 30 have a generally semi-circular form with a straight edge 32 and curved edge 34. The straight edge 32 includes a set of teeth 32 identical to the teeth 28 on the connecting edges 26 of the building module 20. Thus, the terminating caps 30 connect with the connecting edges 24 of the building modules 20 in the same manner as the connecting edges 24 of two adjacent building modules 20. FIG. 11 illustrates a building module 20 with terminating caps 30 connected to all four connecting edges 24.

Figure 12:
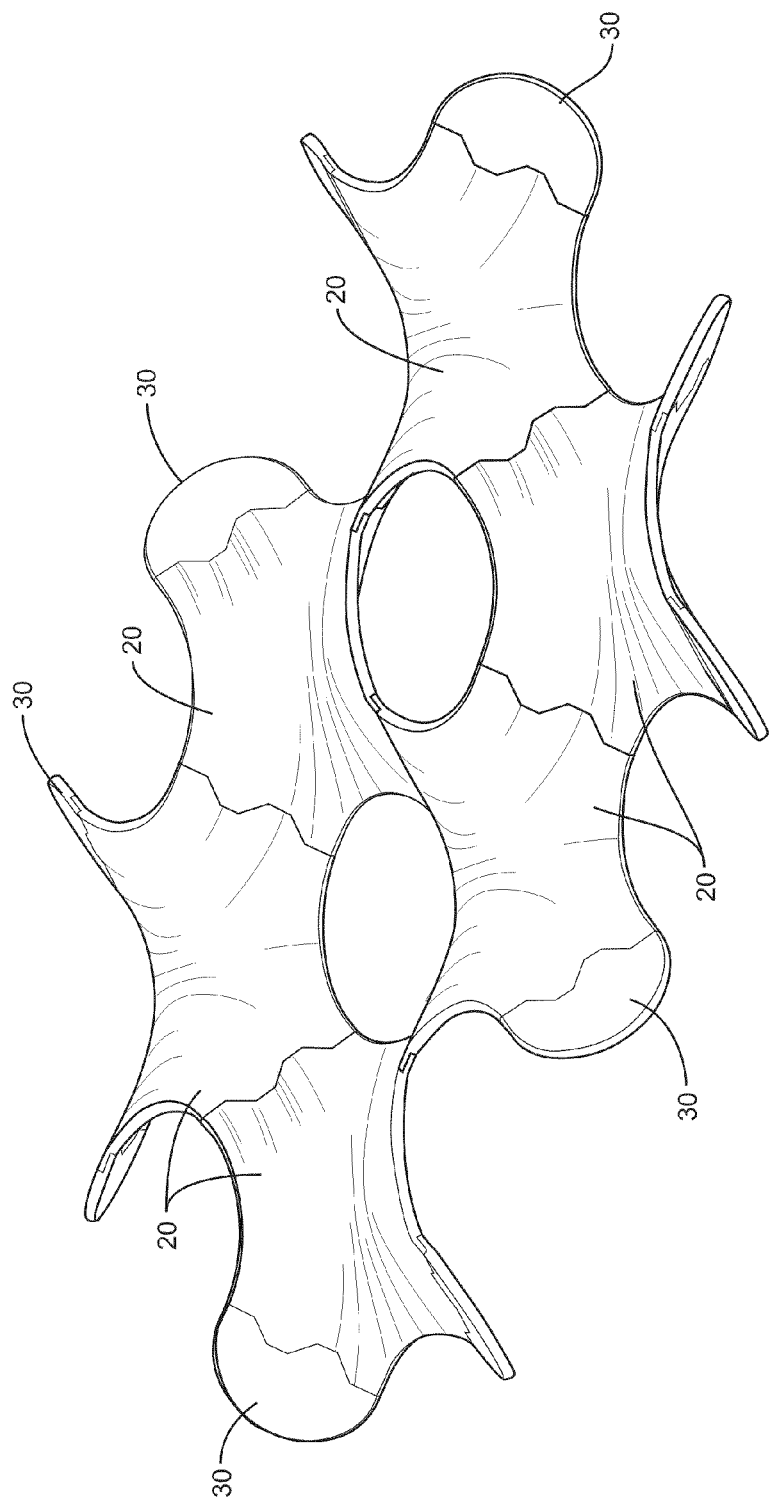
FIG. 12 is a perspective view of a simple structure formed with six building modules according to a second embodiment.
Figure 13:
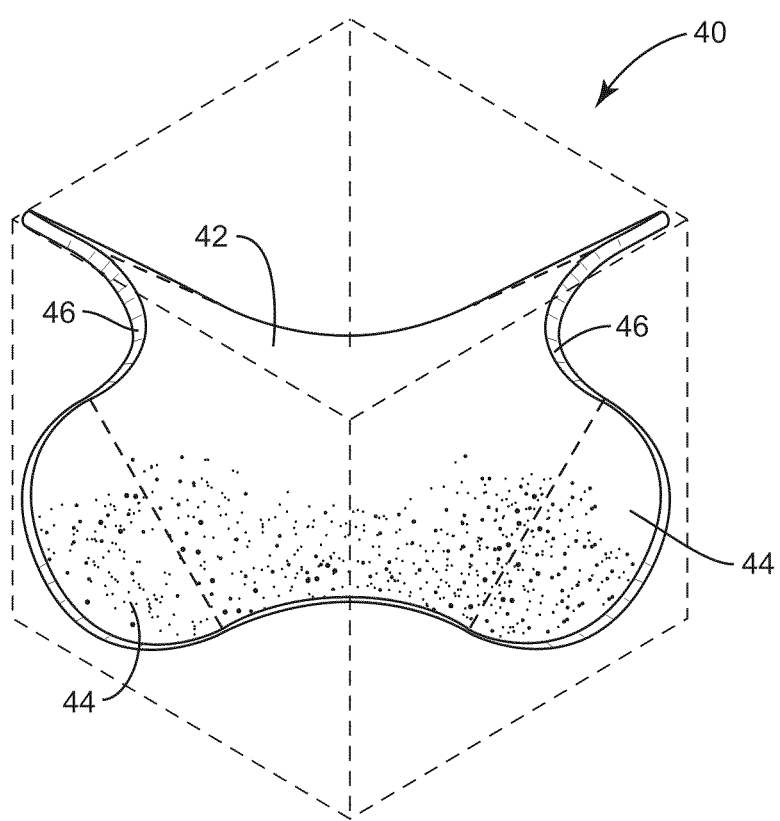
FIG. 13 is an isometric view of an exemplary building module according to a third embodiment.
Figure 14:
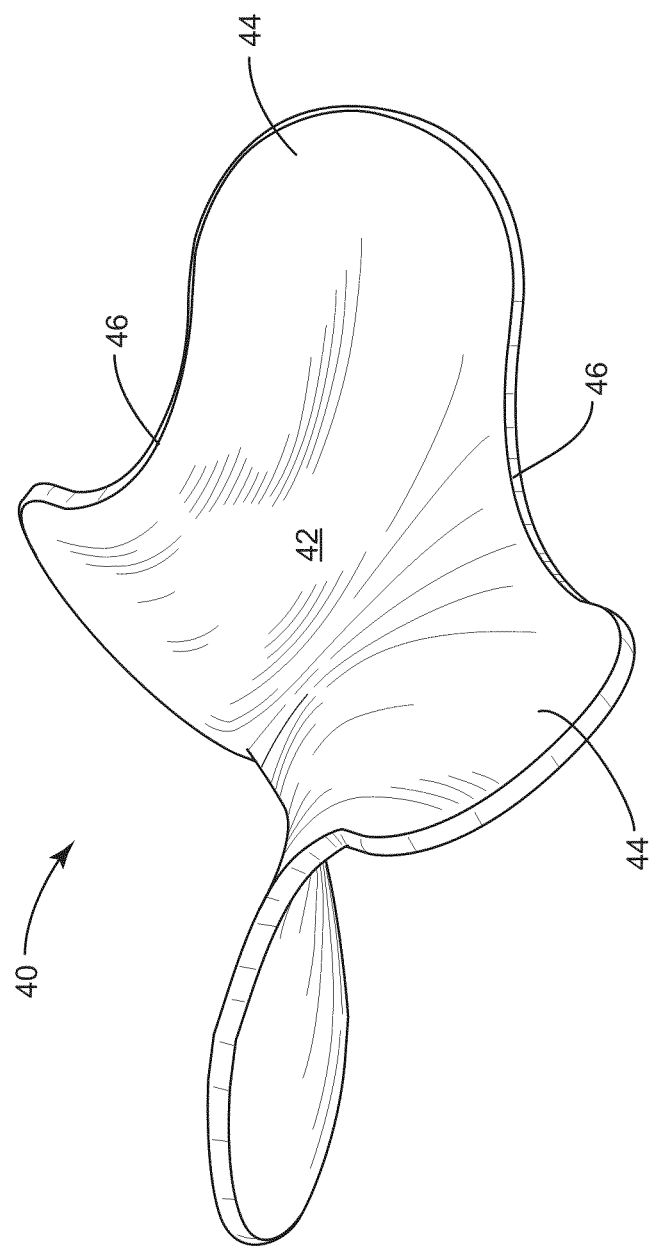
FIG. 14 is a perspective view of an exemplary building module according to a third embodiment.
Figure 15:
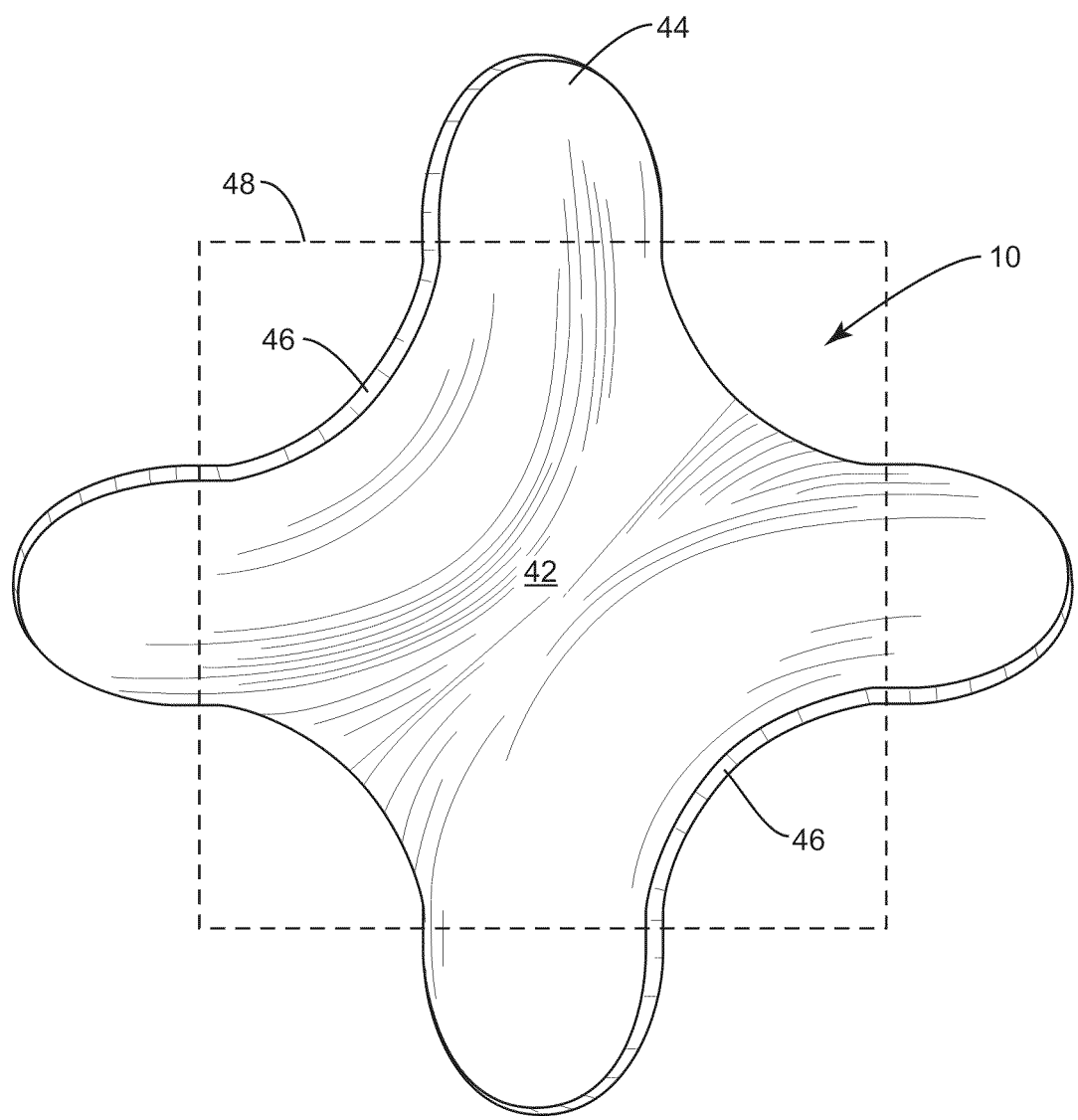
FIG. 15 is a top view of the building module according to the third embodiment.
Figure 16:
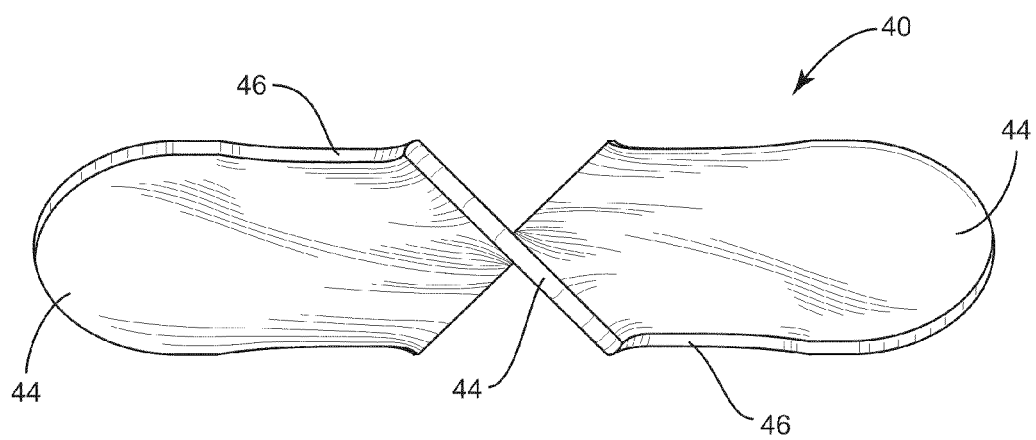
FIG. 16 is a front elevation view of the building module according to the third embodiment.
Figure 17:
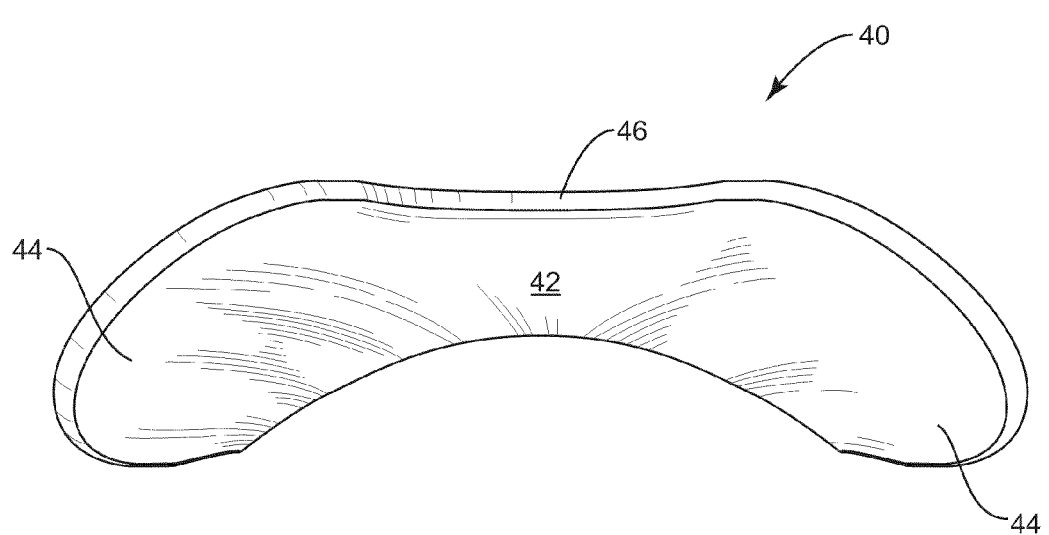
FIG. 17 is an elevation view of the building module according to the third embodiment from a 45 degree angle.

FIG. 12 illustrates a simple planar structure formed with six building modules 20 and ten terminating caps 30. The structure shown in FIG. 12 employs only mirror-image joints so that it extends in essentially two dimensions. As previously described, the connected building modules 20 form a continuous membrane that divides space into two regions. The continuous membrane, however, is broken by openings formed by the truncating edges 26.

FIGS. 13-17 illustrate an exemplary building module 40 according to another embodiment of the invention. The building module 40 comprises a saddle-shaped membrane 42 with four protruding lobes 44 connected by four truncating edges 46. The building module 40 can be derived from the building module 20 by replacing the connecting edges 24 with semi-circular lobes that protrude from the face of the circumscribing cube. The shape of the building module 40 is the same shape as building module 20 with the terminating caps 30 connected to the four connecting edges 26. That is, the building module 40 in FIGS. 13-17 can be derived by making the terminating caps 30 integral with building module 20. In this embodiment, the building modules 40 may be interconnected by overlapping the protruding lobes 42 of the adjacent building modules 40.

Figure 18:
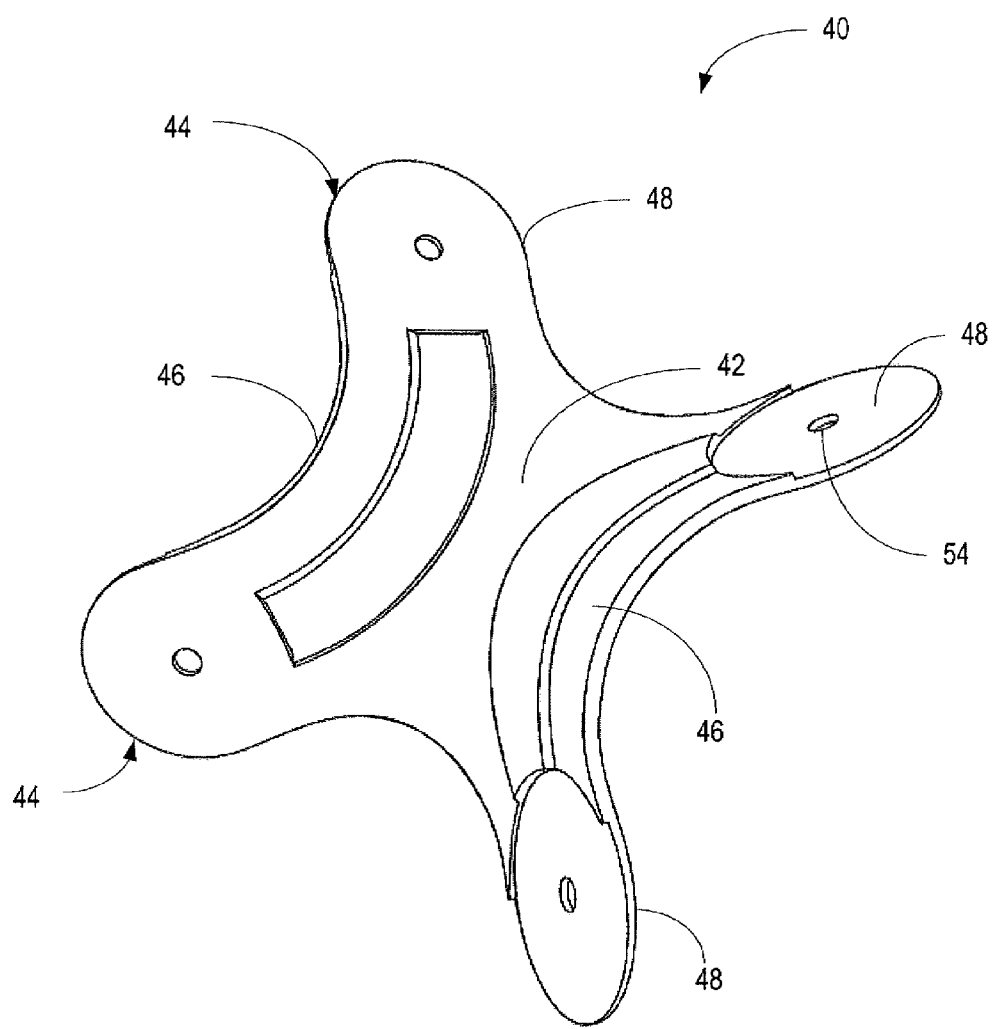
FIG. 18 is a perspective view illustrating of a building module according to the third embodiment where the protruding lobes are configured to form lap joints.
Figure 19:
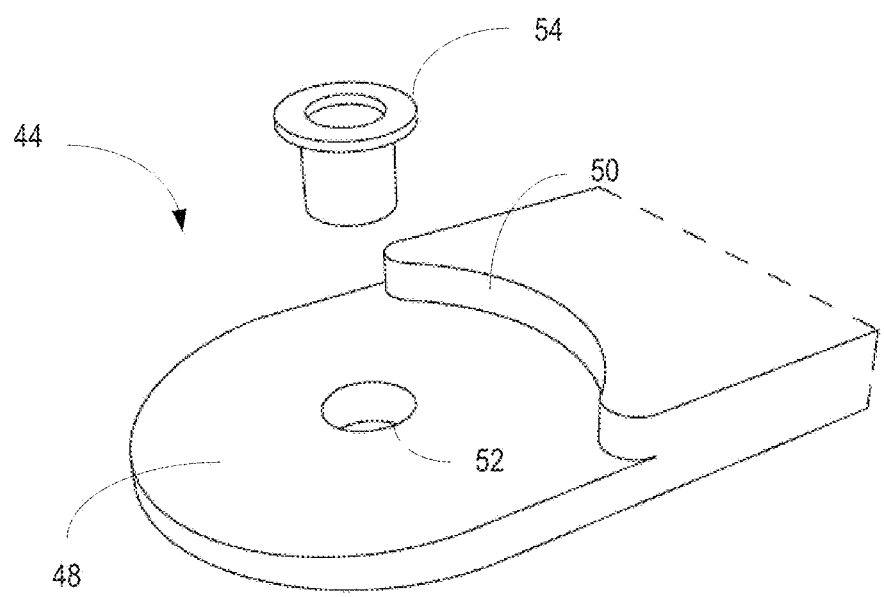
FIG. 19 is a detailed perspective view illustrating a first configuration of the protruding lobes.
Figure 20:
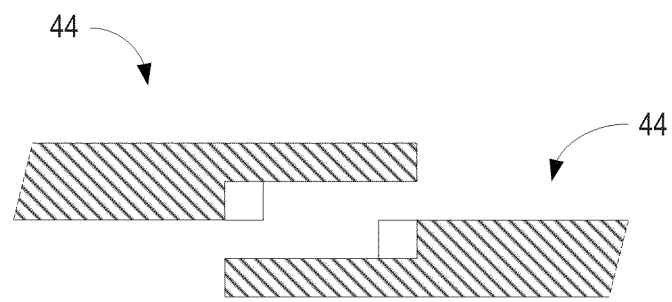
FIGS. 20 and 21 are section views illustrating the formation of a lap joint between two building modules.
Figure 21:
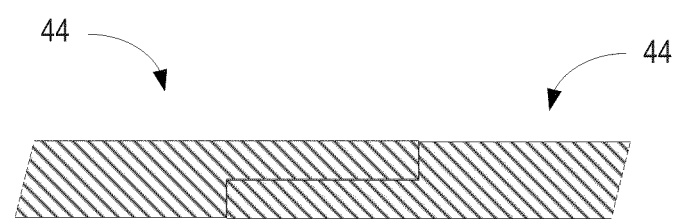

As shown in FIGS. 18 and 19, the protruding lobes 44 of the building module 40 can be configured to form lap joints when connected with like building modules 40. In FIGS. 18 and 19, the protruding lobes 44 include recessed surfaces 48 so that the protruding lobes 44 of adjacent modules 40 can overlap. A wall 50 is disposed adjacent the back edge of the recessed surface 48. FIGS. 20 and 21 illustrate a lap joint formed by the protruding lobes 44 on two adjacent modules 40.

Figure 22:
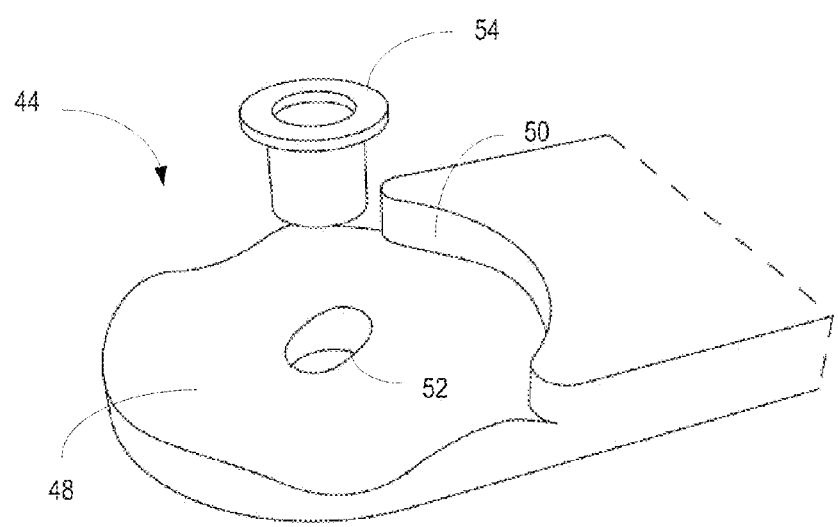
FIG. 22 is a detailed perspective view illustrating a second configuration of the protruding lobes.

The protruding lobes 44 may include an opening 52 therein to enable a bolt, pin, or other fastener 54 to pass through aligned openings 50 in the protruding lobes 44 to secure the building modules 40 together. The fastener 54 may comprise a locking pin 54 as shown in FIG. 19 that frictionally engages with the opening 52 in the protruding lobe 44. In some embodiments, the opening 52 or locking pin 54 may includes detents to help prevent the locking pin 54 from sliding out of the opening 52. Alternatively, a bolt may be inserted through the aligned openings 52 and secured by a nut. The protruding lobes 44 may include undulations or serrations as shown in FIG. 22 to prevent twisting or slipping.

The protruding lobes 44 can also be formed with interlocking features to resist separation of connected building modules 40 without the need of a separate fastener. The interlocking features can comprise detents, mating tongue and groove elements, mating recesses and projections, latches, or other interlocking elements or a combination thereof. FIGS. 23-29 illustrate exemplary ways for using interlocking features on the protruding lobes 44 to resist separation of the building modules 40. For convenience, similar reference numbers are used in the Figures to indicate similar elements.

Figure 23:
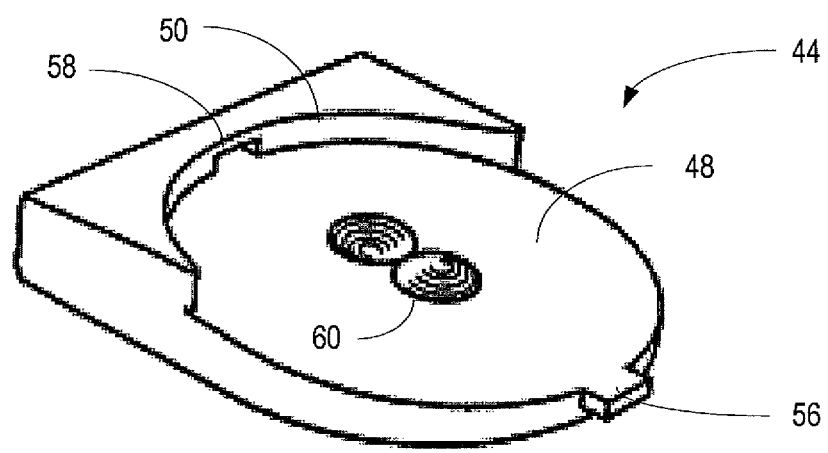
FIG. 23 is a detailed perspective view illustrating a third configuration of the protruding lobes.

FIG. 23 illustrates a protruding lobe 44 using both a detent and tongue and groove elements to resist separation of connected building modules 40. The protruding lobe 44 includes a recessed surface 48 as previously described. A tongue 56 projects forwardly from the front edge of the recessed surface 48. The back wall 50 of the recessed surface 48 includes a groove or slot 58 configured to receive the tongue 56 on the protruding lobe 44 of another building module 40. The engagement of the tongues 56 on two connected building modules 40 in the corresponding grooves 58 of the connected building modules 40 prevents vertical separation. In some embodiments, the groove 58 may be sized and shaped to frictionally engage the tongue 56 to resist separation in the axial direction as well. Alternatively, or in addition, a detent, such as a ball detent 60, can be formed on the recessed surface 48 to interlock with a similar ball detent 60 on the recessed surface of a mating building module 40. The ball detent 60 is located along a center axis of the protruding lobe 44 slightly forward of the center of the recessed surface 48. Thus, when the building modules 40 slide together, the ball detents 60 will slide over one another. The ball detents 60 will resist separation of the building modules until sufficient pulling force is applied to disengage the building modules 40.

Figure 24:
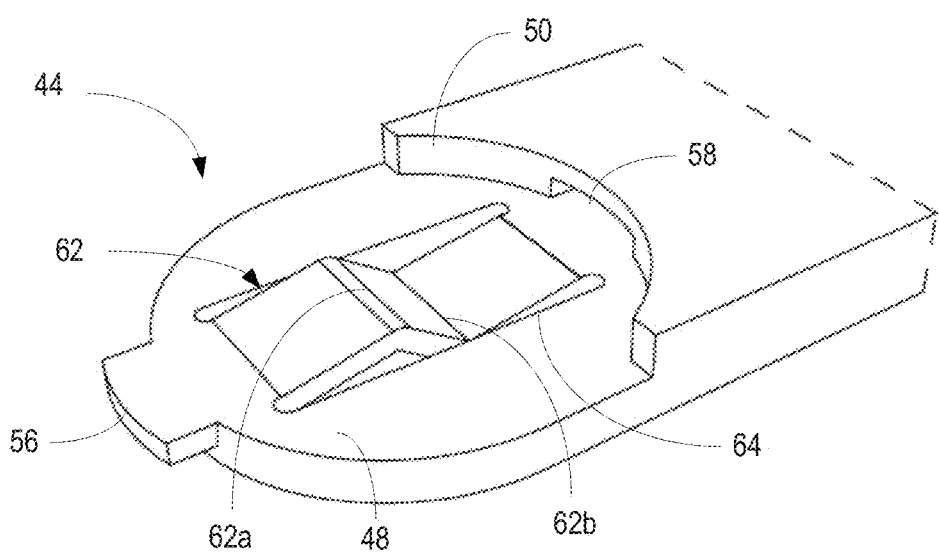
FIG. 24 is a detailed perspective view illustrating a fourth configuration of the protruding lobes.

FIG. 24 illustrates a protruding lobe 44 similar to FIG. 23 with a different detent mechanism. The protruding lobe 44 includes a recessed surface 48 as previously described. A tongue 56 projects forwardly from the front edge of the recessed surface 48. The back wall 50 of the recessed surface 48 includes a groove or slot 58 configured to receive the tongue 56 on the protruding lobe 44 of another building module 40. The engagement of the tongue 56 on one building modules 40 in the corresponding groove 58 of the connected building modules 40 resists separation of the building modules 40. In this embodiment, a spring detent 62 is integrally formed with the recessed surface by forming slots 64 in the recessed surface. The spring detent 62 includes sloped surfaces forming a peaks and a valleys. When the building modules 40 slide together, the peaks 62a of the spring detents 62 will slide over one another and engage in the valleys 62b in the recessed surface 48 of the mating building module 40. The detents 62 will resist separation of the building modules until sufficient pulling force is applied to disengage the building modules 40.

Figure 25:
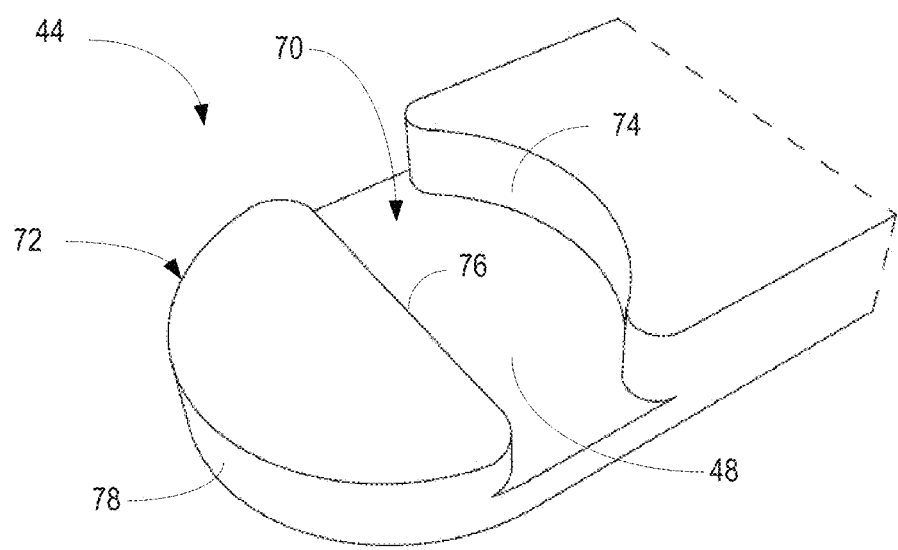
FIG. 25 is a detailed perspective view illustrating a fifth configuration of the protruding lobes.

FIG. 25 illustrates an alternative design for the protruding lobe 44 that relies on interlocking elements on a first building module 40 that frictionally engage with complimentary elements on the protruding lobe 44 of a second building module 40. In this embodiment, the protruding lobe 44 includes similarly formed recesses and projections 70 and 72 respectively. In the illustrated embodiment, recess 70 and projection 72 are generally semicircular in form. The recess 70 is bounded on one side by an arcuate shaped back wall 74 and on the opposite side by the protrusion 72. The protrusion 72 includes sidewalls 76 and 78. Side wall 76 of the protrusion 72 forms a front wall of the recess 70. The recess 70 and protrusion 72 are similarly formed so that the protrusion 72 fits into the recess 70 of the protruding lobe 44 of a mating building module 40. When the building modules 40 are connected, the side walls 78 of the protrusion 72 on one building module 40 engage with the back wall of the recess 70 in the second building module 40, while the sidewall 76 of the first building module 40 engages with the similar sidewall 76 on the protrusion of the second building module 40. The recesses 70 and protrusions 72 form an interlocking arrangement preventing separation in the axial direction, while the frictional engagement resists separation in the vertical direction. The building modules 40 can be separated by applying pulling force in the vertical direction to disengage the recesses 70 and protrusions 72 of the connected building modules 40. In some embodiments, the walls 74, 76, 78 can include undercuts or detents to help resist separation of the building modules 40.

Figure 26:
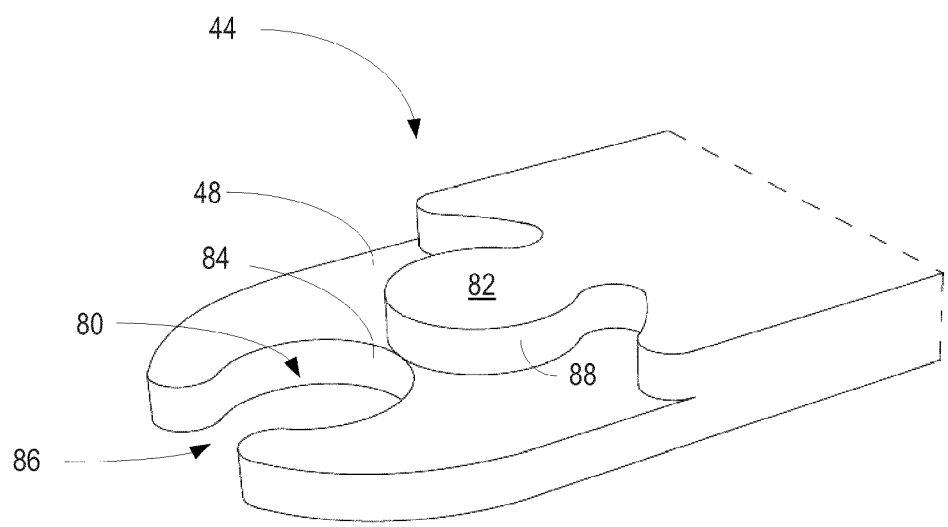
FIG. 26 is a detailed perspective view illustrating a sixth configuration of the protruding lobes.

FIG. 26 illustrates another alternative design in the protruding lobe 44 using complimentary recesses and protrusions. The protruding lobe 44 includes a recessed surface 48. A recess 80 is formed in the forward portion of the recessed surface 48. The recess 80 is surrounded by a side wall 84. The recess 80 includes a forward facing slot 86. A projection 82 is formed on the rearward portion of the recessed surface 48. The shape of the projection 82 complements the shape of the recess 80. In this exemplary embodiment, the recess 80 and projection 82 have a generally circular form. As with the previous embodiment, the recess 80 of a first building module 40 is designed to receive the projection 82 on the protruding lobe 44 of a second building module 40. When the building modules 40 are connected, frictional engagement between the wall 84 of the recess 80 and the side wall 88 of the projection 82 resists vertical separation of the building modules 40. Also, the complimentary shapes of the recess 80 and projection 82 prevent separation in the axial direction. The material of the protruding lobe 44 may be sufficiently flexible to allow the building modules 40 to be connected together by sliding the modules together in the axial direction so that the projection 82 passes through the slot 86 in the front side of the recess 80.

Figure 27A:
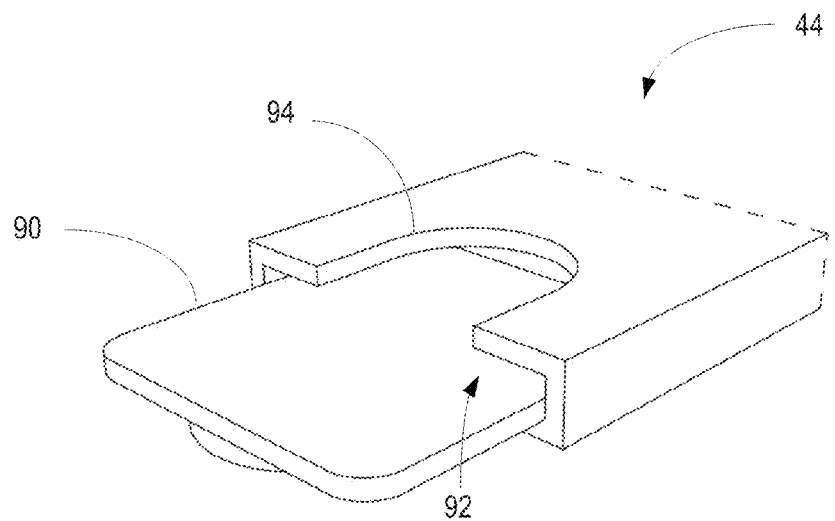
FIGS. 27A and 27B is a detailed perspective view illustrating a seventh configuration of the protruding lobes.
Figure 27B:
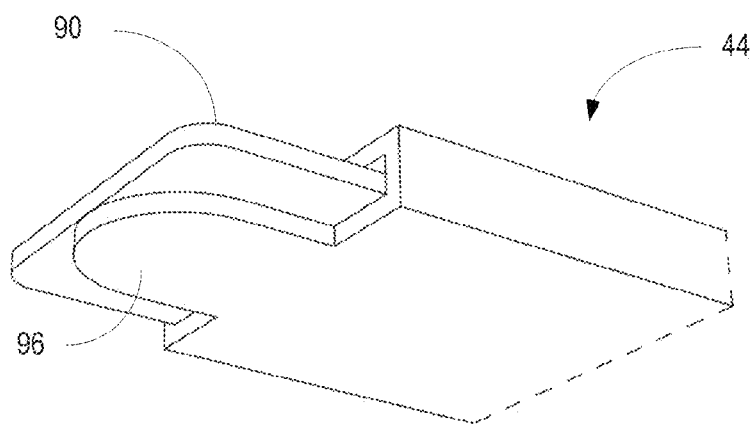

FIGS. 27A and 27B illustrate another alternative design of the protruding lobe 44 using a tongue-in-groove arrangement for connecting the building modules 40. In this embodiment, the protruding lobe 44 includes a forwardly projecting tongue 90 and a groove or channel 92 to receive the tongue 90 on the protruding lobe 44 of a mating building module 40. In this embodiment, the building modules 40 slide together in the axial direction so that the tongue 90 on one building module 40 slides into a complimentary groove or channel 92 on the other building module 40. The tongue 90 and groove or channel 92 may be sized and shaped to frictionally engage one another to resist separation of the building modules 40. In some embodiments, the tongue 90 may include a projection 96 extending from one side of the tongue 90 that engages a recess or slot 94 formed in the protruding lobe 44 on the opposite side of the tongue 90.

Figure 28:
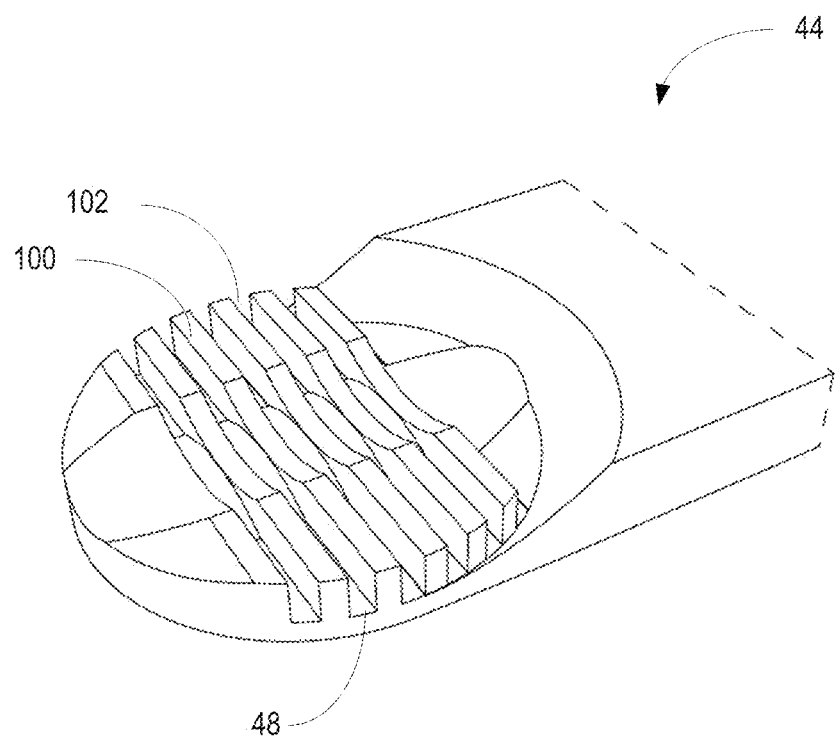
FIG. 28 is a detailed perspective view illustrating an eighth configuration of the protruding lobes.

FIG. 28 illustrates another design of the protruding lobe 44 using interlocking features to join the building modules 40. In this embodiment, the protruding lobe 44 includes a recessed surface 48. A plurality of parallel fins 100 separated by channels or grooves 102 extend upwardly from the recessed surface 48. The fins 100 and grooves or channels 102 are arranged so that the fins 100 on a protruding lobe 44 of a first building module 40 frictionally engage in the grooves or channels 102 on the protruding lobe 44 of a second building module 40. The frictional contact resists separation in the vertical direction while the interlocking fins 100 prevent separation in the axial direction.

Figure 29:
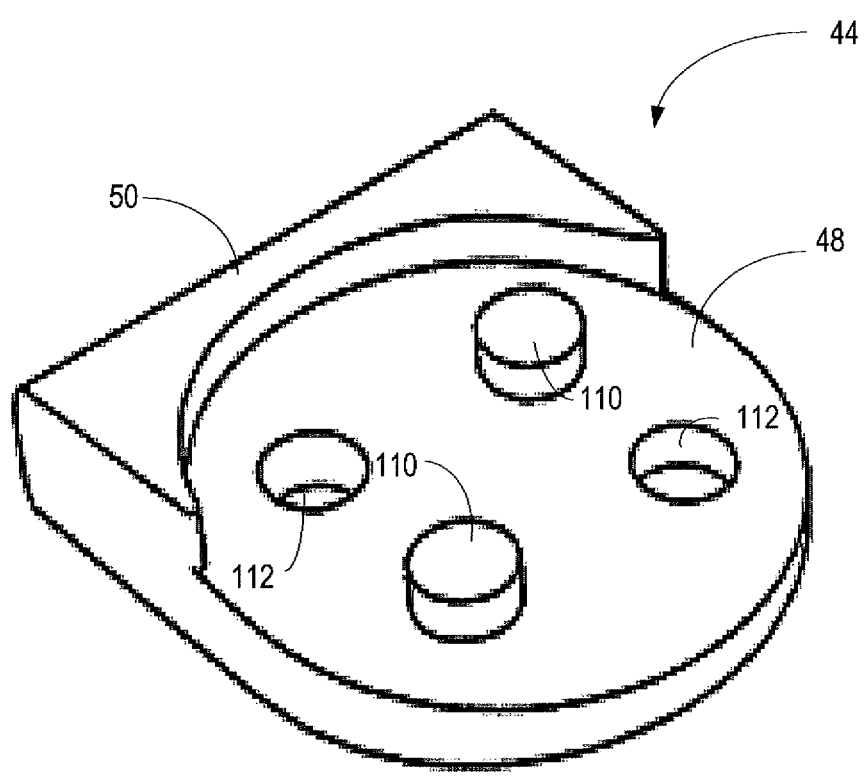
FIG. 29 is a detailed perspective view illustrating a ninth configuration of the protruding lobes.

FIG. 29 illustrates another alternative design of the protruding lobe 44 using complimentary posts 110 and holes 112 to resist separation of connected building modules 40. The protruding lobe 44 includes a recessed surface 48 with an arcuate shaped back wall 50 as previously described. One or more posts 110 extend upwardly from the recessed surface 48. One or more complimentary holes 112 are formed in the recessed surface to receive the post 110 on the protruding lobe 44 of a connected building module. When the building modules 40 are connected, the posts 110 on the protruding lobe 44 of a first building module 40 engage in the holes 112 of a second building module. The posts 110 and holes 112 are sized so that the side walls of the posts frictionally engage with the side walls of the holes 112.

Figure 30:
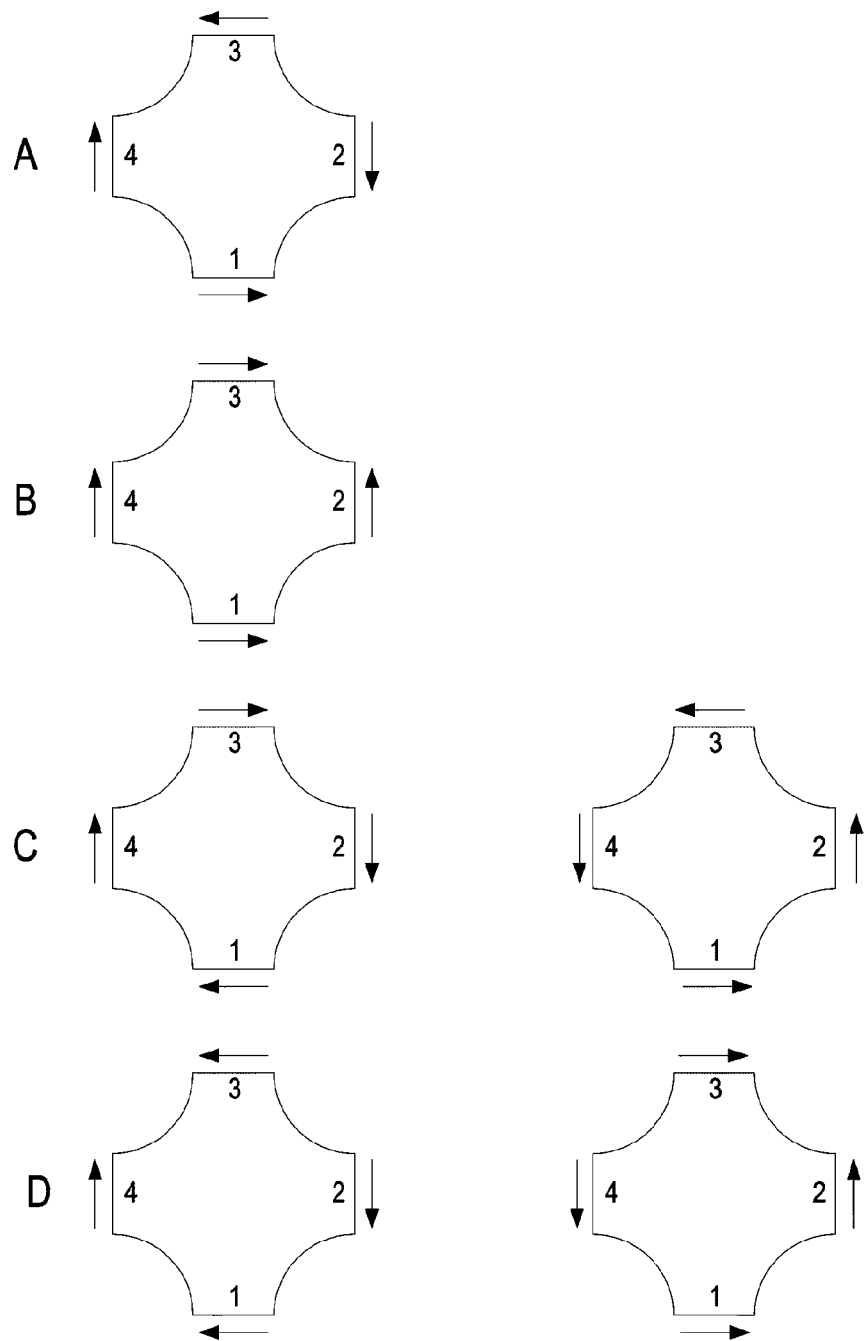
FIG. 30 illustrates how to form curved membranes of different shape for the building modules.
Figure 31A:
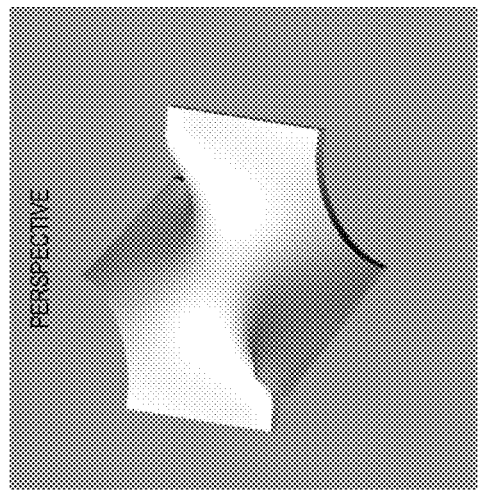
FIGS. 31A-31D illustrate building modules with curved membranes of different shapes.
Figure 31B:
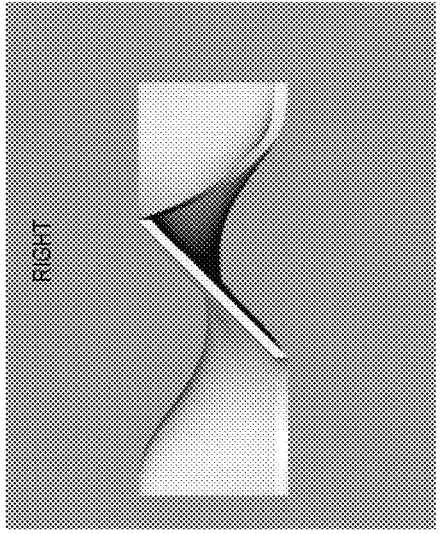
Figure 31C:
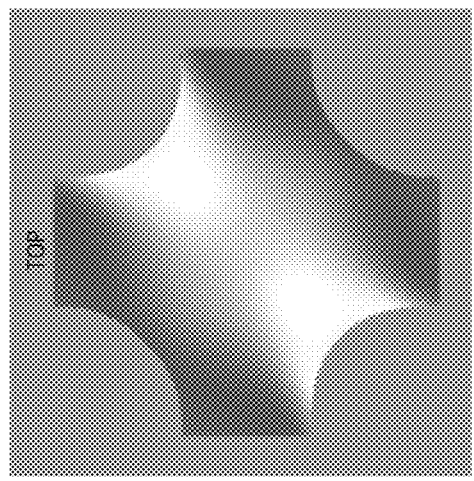
Figure 31D:
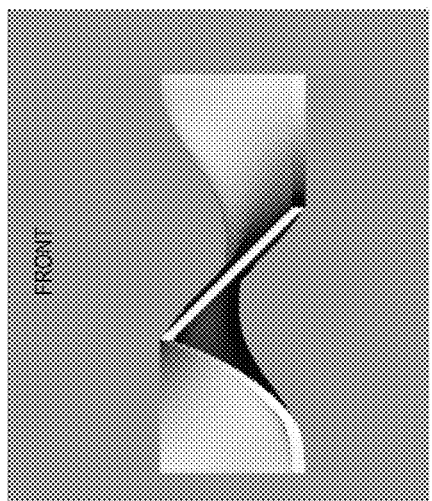
Figure 32A:
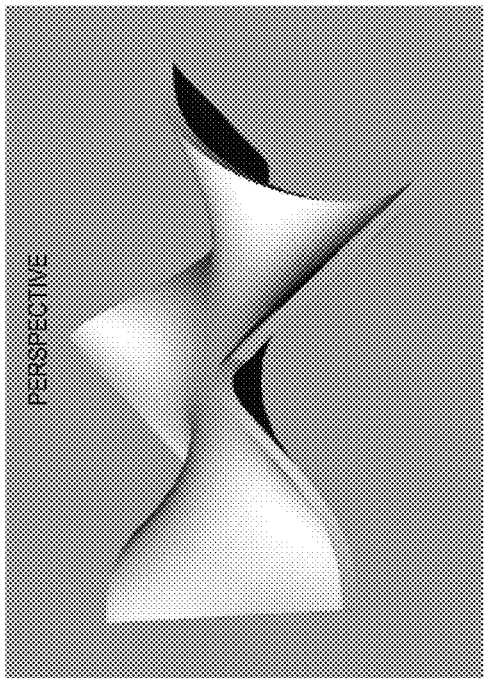
FIGS. 32A-32D illustrate building modules with curved membranes of different shapes.
Figure 32B:
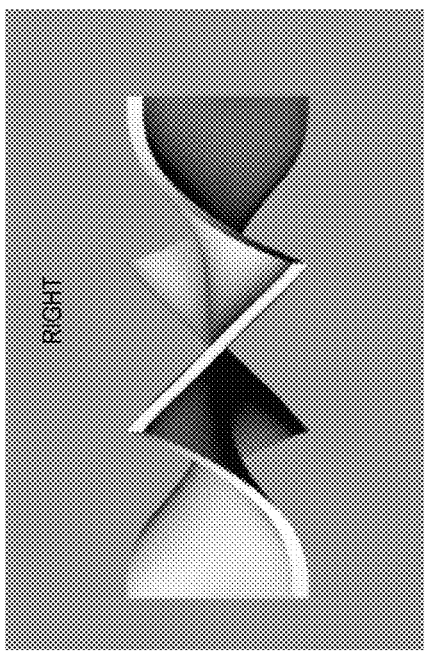
Figure 32C:
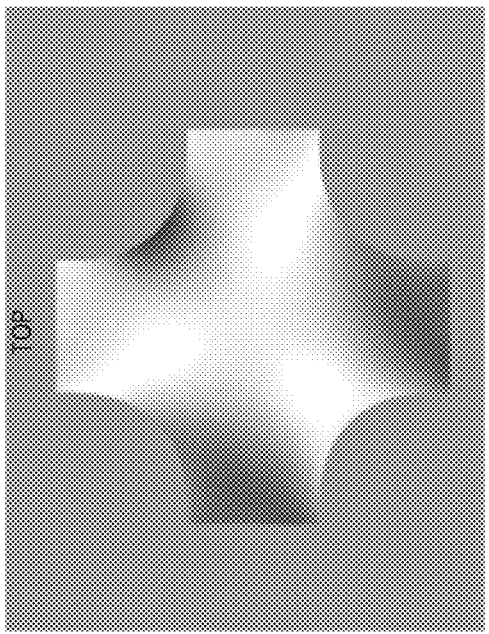
Figure 32D:
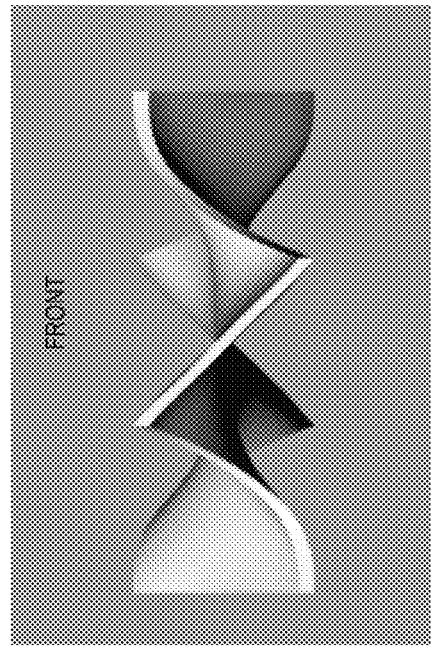
Figure 33B:
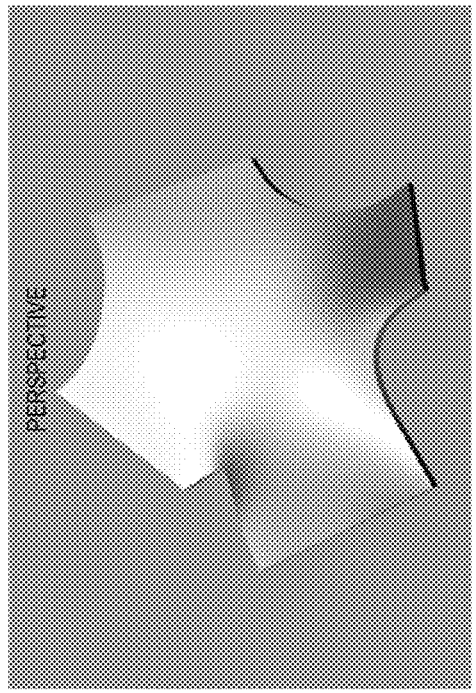
FIGS. 33A-33D illustrate building modules with curved membranes of different shapes.
Figure 33D:
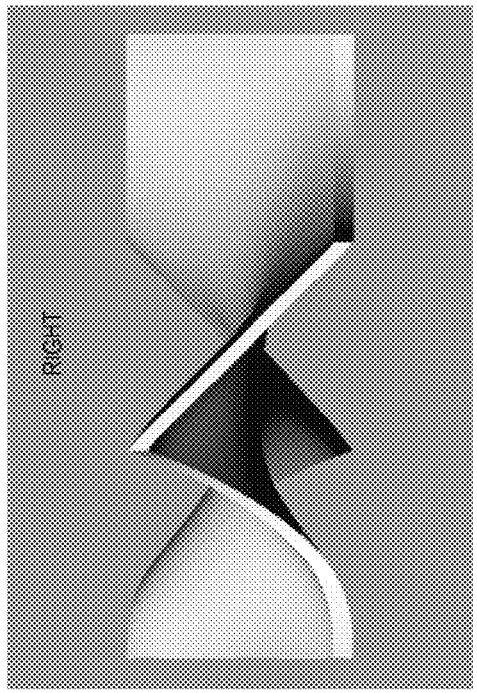
Figure 33A:
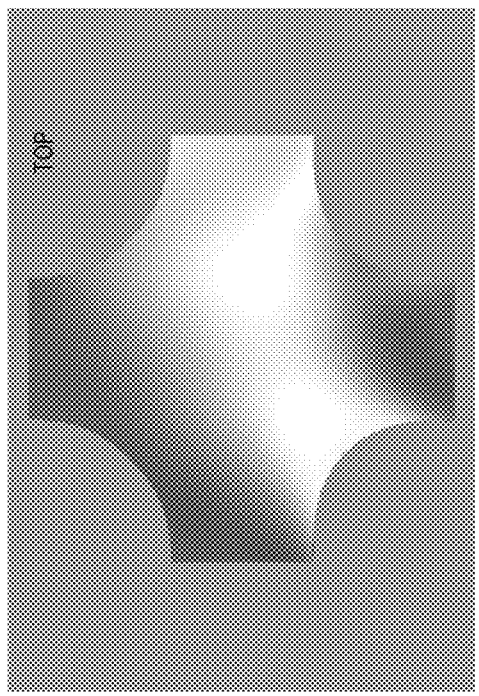
Figure 33C:
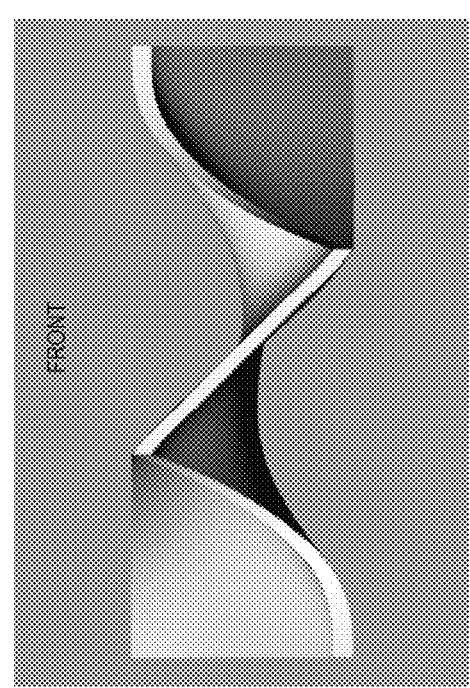

FIG. 30 illustrates how saddle surfaces 42 for the building modules 40 of varying shapes can be formed according to the present invention. Four basic shapes denominated by the letters A through D are shown in FIG. 30. The four basic shapes A through D all have the identical foot print when seen from the top. Shapes C and D have right-handed and left-handed versions. For convenience, the sides of the circumscribing cube have been labeled 1 through 4. The arrows adjacent the connecting edges 44 indicate the direction in which the connecting edge 44 slopes. As previously described, the connecting edges lie along a diagonal on the face of a circumscribing cube. The arrowheads point in upward direction.

Shape A shown in FIG. 30 is illustrated in FIGS. 11 through 17. In this embodiment, the connecting edges 44 on opposing faces of the circumscribing cube incline in opposite directions. The ends of the corresponding diagonals join with ends of the diagonal on adjacent faces.

Shape B shown in FIG. 30 is illustrated in FIGS. 31A-31D. In these embodiments, the connecting edges 44 on opposing faces of the circumscribing cube extend in the same direction. In these embodiments, one end of each corresponding diagonal joins with an end of a diagonal on an adjacent face. Shape B can be derived from shape A by changing the direction of the connecting edges 44 on two adjacent sides of the building module 40.

Shape C shown in FIG. 30 is illustrated in FIGS. 32A-32D. In these embodiments, the connecting edges 44 on opposing faces of the circumscribing cube extend in opposite directions. In these embodiments, none of the corresponding diagonals connect with any other diagonal. This shape has right-handed and left-handed variations as shown in FIG. 30. Shape C can be derived from shape A by changing the direction of the connecting edges 44 on two opposing sides of the building module 40.

Shape D shown in FIG. 30 is illustrated in FIGS. 33A-33D. In these embodiments, the connecting edges 44 on a first pair of opposing sides extend in opposite directions while the connecting edges 44 on the other pair of opposing sides extend in the same direction. In these embodiments, the corresponding diagonals on three sides of the circumscribing cube meet at the corners of the circumscribing cube. The fourth diagonal does not meet with any other diagonals. This shape also comes in right-handed and left-handed variations as shown in FIG. 30.

The complex structures which can be made using modules according to the present invention are far more interesting than conventional building blocks or child's construction toys. To further the enjoyment, the building modules 20, 30, 40 can be made of different colors or displayed designs, and printed on the surfaces of the modules 20, 30, 40. For example, the opposing surfaces of the membrane 22, 32, 42 may be of different colors to emphasize the interesting fact that any structure built with the building modules 20, 30, 40 will effectively divide space into two separate but complementary volumes: one surrounded by each color.

Figure 34:
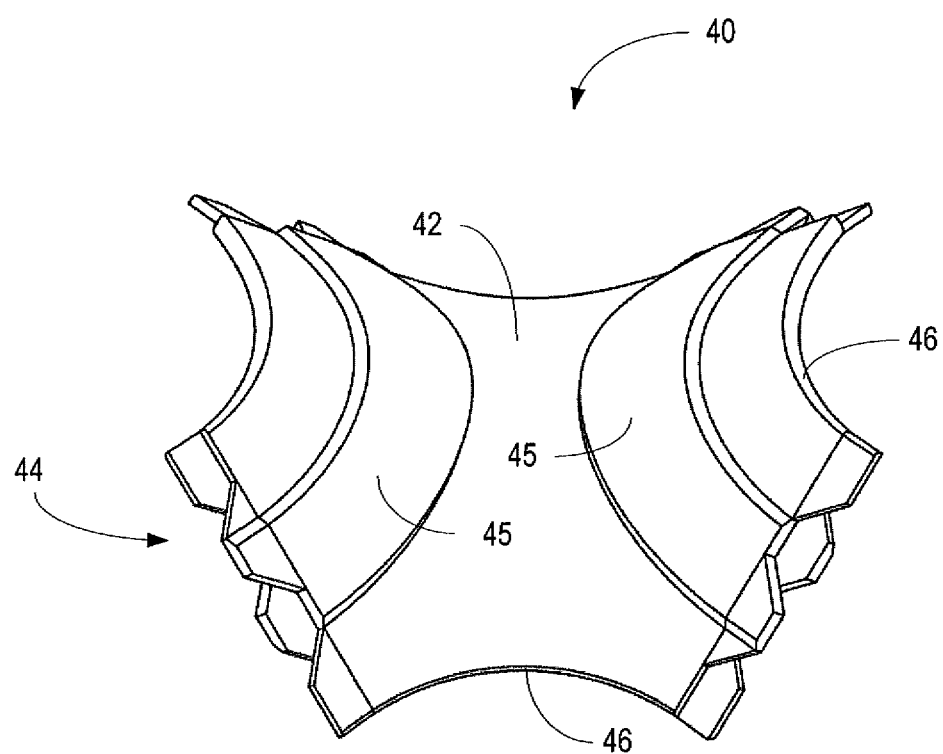
FIG. 34 illustrates a building module with arcuate lines on the surface of the curved membrane.

FIG. 34 illustrates an exemplary module 20 as shown in FIGS. 10 and 11 with raised arcuate lines 28 on the top and bottom surfaces of the membrane 42. The arcuate-shaped lines 28 begin at the center of one connecting edge 24 and extend to the center of an adjacent connecting edge 24. When two modules 20 are joined, the arcuate lines 28 will appear to be continuous and will extend from module 20 to module 20. The line formed could close on itself to form a circle or meander about indefinitely, adding to the interest of the structures. The shape formed by the arcuate lines 28 on two adjacent modules 20 indicates the type of joint. If a mirror image joint is used, the arcuate lines 28 form a "C" shape. If a helix joint is used, the arcuate lines 28 form an "S" shape. A regular "S" shape indicates a left-handed helix joint while an inverted "S" shape indicates a right-handed helix joint.

Figure 35:
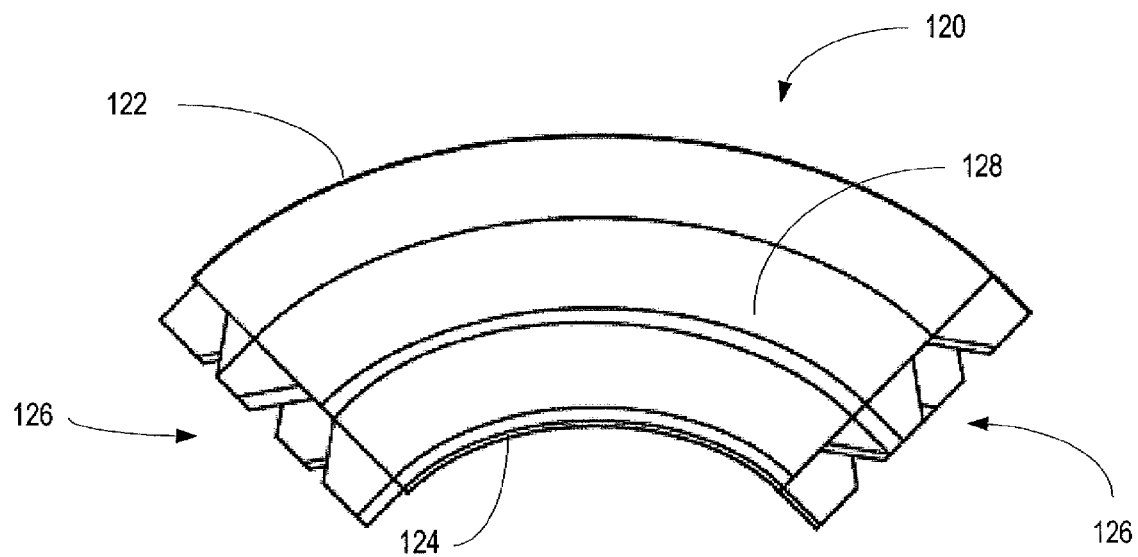
FIGS. 35 and 36 illustrate an arch-shaped chip for connecting building modules.
Figure 36:
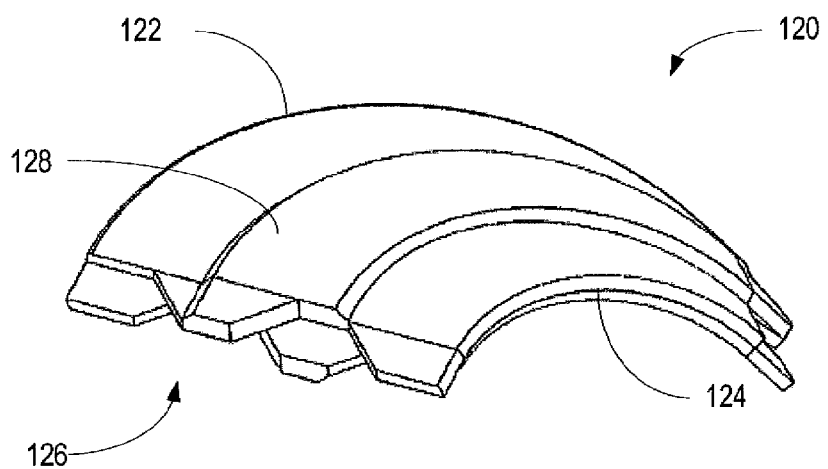

FIGS. 35 and 36 illustrate an arc-shaped chip 120 that can be used to connect building modules 20 together. The arc chip 120 includes truncating edges 122, 124 and two connecting edges 126 at opposing ends of the arc chip 120. The planes of the two connecting edges are perpendicular. The connecting edges of the arc chip 120 are configured to mate with the connecting edges 24 of the building module 20. The arc chip may include a raised arcuate line 128 as previously described.

Figure 37:
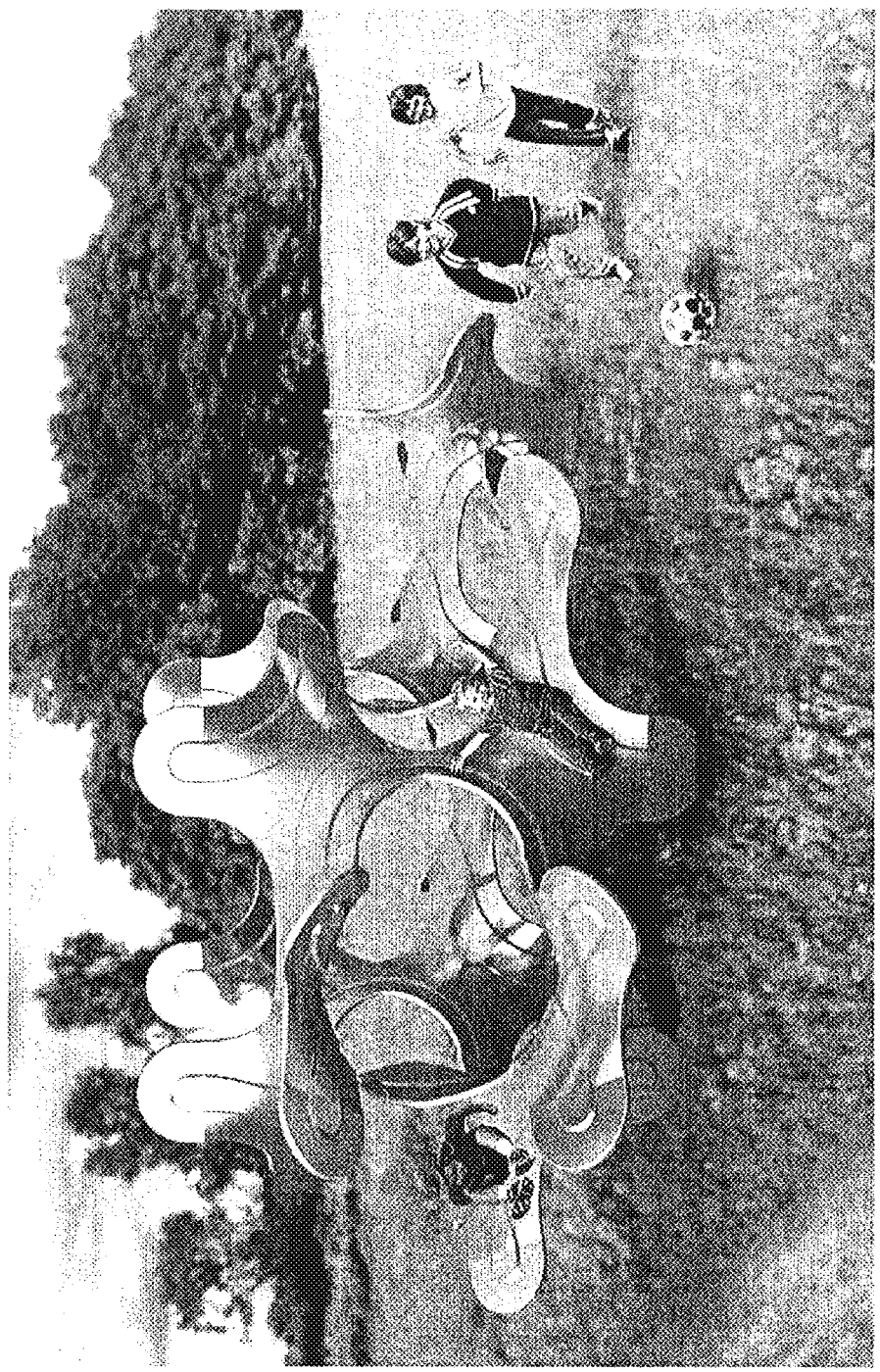
FIG. 37 illustrates a playground structure constructed with building modules according to the present invention.
Figure 38A:
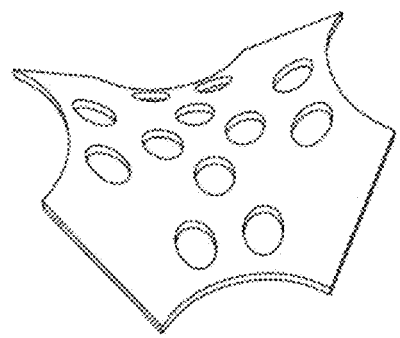
FIG. 38A-E illustrates a building module with holes in the curved membrane to form hand and foot holds.
Figure 38B:
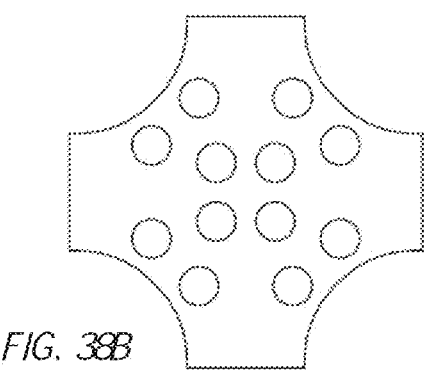
Figure 38C:
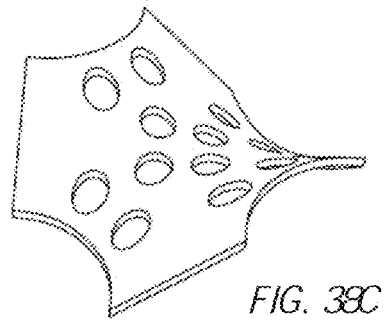
Figure 38D:
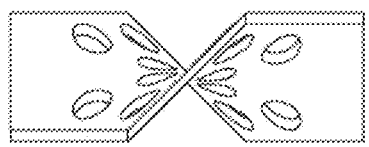
Figure 38E:
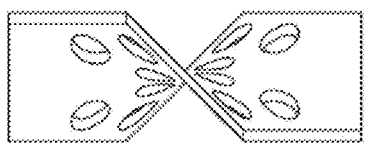

FIG. 37 illustrates a playground structure constructed using building modules 20 as herein described. In the case of playground equipment, it may be useful to from opening in the curved membrane 22 to use and hand holds and footholds as shown in FIGS. 38A-38E.

The building modules according to the present invention may be used as construction toys to stimulate a child's exploration of complex geometries and complex spaces. Additionally, large scale building modules 20, 30, 40 as herein described can be used to construct play structures on which or through which a child may crawl, climb, or slide. FIG. 37 illustrates an exemplary play structure constructed using building modules 30, 40. The play structures can be constructed by children in the playground, allowing the children to construct the structures on which they play. As previously noted, the building modules can be disconnected and reassembled by the children to form a variety of structures on which to play.

What is claimed is:

1. A building module comprising:
   a saddle-shaped membrane disposed within an imaginary circumscribing cube that bounds the saddle-shaped surface;
   a plurality of lobes protruding from the saddle-shaped membrane, each protruding lobe being oriented along a diagonal on a respective face of the circumscribing cube and extending perpendicularly from the respective faces of the imaginary circumscribing cube;
   a plurality of truncating edges curving inwardly from the faces of the imaginary circumscribing cube, each truncating edge extending between a respective pair of protruding lobes; and
   wherein each said protruding lobes includes a recessed surface configured to overlap with a recessed surface on a protruding lobe of like building module so as to form a lap joint.

2. The building module of claim 1 wherein the recessed surface is tapered.

3. The building module of claim 1 wherein each protruding lobe includes at least one opening extending through the recessed surface and positioned to align with an opening in an overlapping lobe of a like building module.

4. The building module of claim 3 further comprising a locking pin or fastener for engaging with the opening in the protruding lobe.

5. A building system comprising a continuous membrane formed from a plurality of building modules, said membrane dividing an occupied space into two subspaces on opposing sides of the membrane and having openings formed therein connecting the subspaces, each said building modules comprising:
   a saddle-shaped membrane disposed within an imaginary circumscribing polyhedron;
   a plurality of lobes protruding from the saddle-shaped membrane and extending beyond respective faces of the imaginary circumscribing polyhedron, at least one of said protruding lobes overlapping a protruding lobe a connected building module; and
   a plurality of truncating edges spaced inwardly from the faces of the circumscribing polyhedron, each truncating edge extending between a respective pair of protruding lobes;
   wherein the openings in said membrane are defined by said truncating edges of two or more connected building modules.

6. The building system of claim 5 wherein the protruding lobes on said building modules are oriented along diagonals on respective faces of the imaginary circumscribing polyhedron and extend perpendicularly from respective faces of the imaginary circumscribing polyhedron.

7. The building system of claim 5 wherein the protruding lobes are configured to form a lap joint when connected with the protruding lobe of a connected building module.

8. The building system of claim 5 wherein the protruding lobes include a recessed surfaces configured to make face-to-face contact with the recessed surfaces on the protruding lobes of connected building module.

9. The building system of claim 8 wherein the recessed surfaces on the protruding lobes are tapered.

10. The building system of claim 8 wherein each protruding lobe includes at least one opening extending through the recessed surface and positioned to align with the opening of an overlapping lobe of a connected building module.

11. The building system of claim 10 further comprising a plurality of locking pins or fasteners for engaging with the aligned opening in the protruding lobes of connected building modules.

* * * * *